(12) United States Patent
Nguyen

(10) Patent No.: US 9,231,362 B2
(45) Date of Patent: Jan. 5, 2016

(54) MULTI-PASS SLAB LASER WITH INTERNAL BEAM SHAPING

(71) Applicant: Synrad, Inc., Mukilteo, WA (US)

(72) Inventor: Linh K. Nguyen, Woodinville, WA (US)

(73) Assignee: Synrad, Inc., Mukilteo, WA (US)

( * ) Notice: Subject to any disclaimer, the term of this patent is extended or adjusted under 35 U.S.C. 154(b) by 0 days.

(21) Appl. No.: 14/297,654

(22) Filed: Jun. 6, 2014

(65) Prior Publication Data
US 2015/0357787 A1  Dec. 10, 2015

(51) Int. Cl.
| | |
|---|---|
| H01S 3/081 | (2006.01) |
| H01S 3/082 | (2006.01) |
| H01S 3/03 | (2006.01) |
| H01S 3/08 | (2006.01) |
| H01S 3/041 | (2006.01) |
| H01S 3/06 | (2006.01) |

(52) U.S. Cl.
CPC .............. *H01S 3/082* (2013.01); *H01S 3/0315* (2013.01); *H01S 3/081* (2013.01); *H01S 3/041* (2013.01); *H01S 3/0606* (2013.01); *H01S 3/0813* (2013.01); *H01S 3/0816* (2013.01); *H01S 3/0818* (2013.01); *H01S 3/08059* (2013.01); *H01S 3/08095* (2013.01)

(58) Field of Classification Search
CPC ..... H01S 3/0315; H01S 3/081; H01S 3/0813; H01S 3/0816; H01S 3/0818; H01S 3/041; H01S 3/0606; H01S 3/08095; H01S 3/08059
USPC .................................. 372/93, 98, 97, 103, 19
See application file for complete search history.

(56) References Cited

U.S. PATENT DOCUMENTS

| | | | |
|---|---|---|---|
| 4,703,491 A | 10/1987 | Lim | |
| 4,719,639 A | 1/1988 | Tulip | |
| 5,048,048 A | 9/1991 | Nishimae et al. | |
| 5,123,028 A | 6/1992 | Hobart et al. | |
| 5,216,689 A | 6/1993 | Gardner et al. | |
| 5,353,297 A | 10/1994 | Koop et al. | |
| 5,661,746 A | 8/1997 | Sukhman et al. | |
| 5,684,820 A * | 11/1997 | Jenkins et al. | .................. 372/64 |
| 6,192,061 B1 | 2/2001 | Hart et al. | |
| 6,256,332 B1 | 7/2001 | Anikitchev | |
| 6,370,178 B1 | 4/2002 | Papayoanou et al. | |
| 6,442,186 B1 * | 8/2002 | Vitruk | .............................. 372/95 |
| 6,603,794 B2 | 8/2003 | Bethel et al. | |
| 6,798,816 B2 | 9/2004 | DeMaria et al. | |
| 2004/0105477 A1 * | 6/2004 | Dutov et al. | ..................... 372/55 |
| 2007/0195839 A1 * | 8/2007 | Monty et al. | ............... 372/38.05 |
| 2012/0219028 A1 * | 8/2012 | Morrow et al. | ................. 372/36 |

* cited by examiner

*Primary Examiner* — Kinam Park
(74) *Attorney, Agent, or Firm* — Osha Liang LLP

(57) ABSTRACT

The laser resonator includes a first resonator wall, a second resonator wall that is substantially parallel to the first resonator wall and is separated from the first resonator wall in a first transverse direction thereby defining a gap having a gap width between the first and second resonator walls, and at least two laser cavity mirrors. The laser cavity mirrors are arranged to allow an intra-cavity laser beam to reflect from the output coupling mirror thereby forming a first beam spot on the output coupling mirror. The first curved mirror has a radius of curvature such that the reflection of the intra-cavity laser beam from the first curved mirror causes the first beam spot on the output coupling mirror to have a substantially symmetric shape.

18 Claims, 18 Drawing Sheets

MULTI-PASS SLAB LASER WITH INTERNAL BEAM SHAPING

BACKGROUND

Multi-pass laser resonators, also called multi-fold or folded laser resonators, are used in lasers to achieve a long effective gain path while maintaining a short physical length for the resonator cavity. A multi-pass laser resonator, also referred to as a multi-pass optical cavity, may be formed by folding a stable single pass resonator one or more times via one or more mirrors. Although the folding of the beam path can occur in one, two, or three dimensions, linearly folded multi-pass resonators have the advantage of being relatively easy to construct. Within the linear multi-pass configuration, complete free space, complete waveguide or hybrid operation can define the axes transverse to the beam path. While the use of a waveguide in the folded axis can constrain laser oscillation to a single mode, it is sometimes desirable to use free space propagation instead, due to the ability to more easily achieve a Gaussian beam in free space.

The fundamental mode of a laser resonator may be characterized by a beam whose beam shape follows a Gaussian intensity distribution. As used herein, the radius of a Gaussian laser beam is defined to be the distance (from the center location of peak intensity in the beam) at which the intensity of the beam is reduced by a factor $1/e^2$. Furthermore, as used herein the waist position of a Gaussian beam is defined to be the longitudinal position along the beam where the smallest radius exists.

Multi-pass laser resonators that operate in a hybrid configuration have output beams that have highly asymmetric cross-sections, also referred to as spot sizes, and/or are highly astigmatic (i.e., the beam waist in one dimension is located at a different axial position along the beam than a beam waist in a perpendicular direction.) Because of this problem, many multi-pass slab lasers require expensive external beam shaping optics to remove the asymmetry and astigmatism in the output beam in order for them to be useful for practical applications such as laser cutting, marking, etching, or the like.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments are directed to a laser resonator. The laser resonator includes a first resonator wall, a second resonator wall that is substantially parallel to the first resonator wall and is separated from the first resonator wall in a first transverse direction thereby defining a gap having a gap width between the first and second resonator walls, and a plurality of laser cavity mirrors. The plurality of laser cavity mirrors includes an output coupling mirror disposed at a first end of the first and second resonator walls and a first curved mirror disposed at one of the first end or a second end of the first and elongated resonator. The plurality of laser cavity mirrors are arranged to allow an intra-cavity laser beam to reflect from the output coupling mirror thereby forming a first beam spot on the output coupling mirror. The plurality of laser cavity mirrors are further arranged to allow the intra-cavity laser beam to reflect from the first curved mirror thereby forming a second beam spot on the first curved mirror. The first curved mirror has a radius of curvature such that the reflection of the intra-cavity laser beam from the first curved mirror causes the first beam spot on the output coupling mirror to have a substantially symmetric shape.

Other aspects of the invention will be apparent from the following description and the appended claims.

DETAILED DESCRIPTION

Figure 1A:
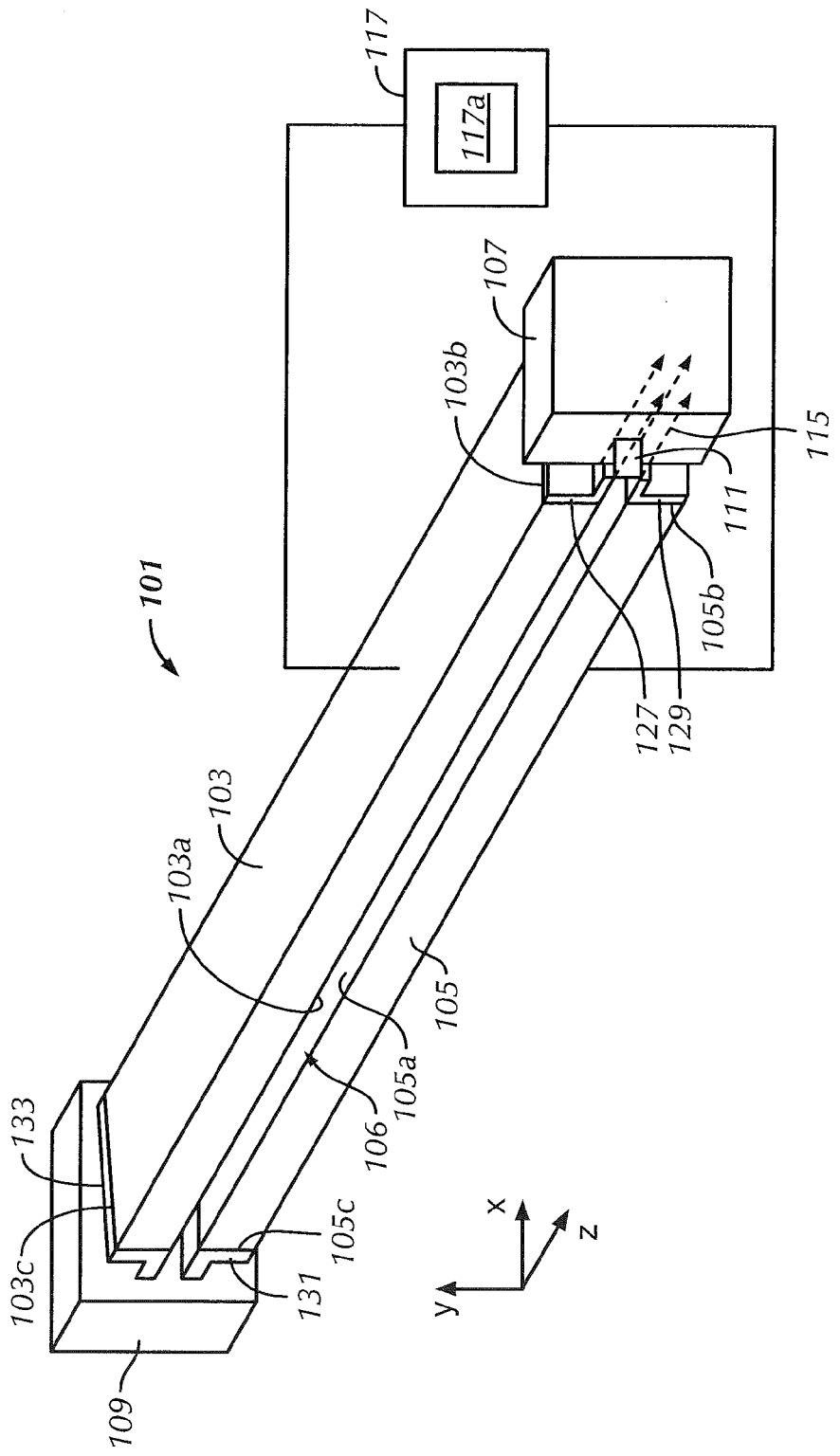
FIGS. 1A-1C show examples of a laser employing a laser resonator in accordance with one or more embodiments.

Specific embodiments of a multi-pass slab laser with internal beam shaping will now be described in detail with reference to the accompanying figures. Like elements in the various figures (also referred to as FIGs.) are denoted by like reference numerals for consistency.

In the following detailed description of embodiments, numerous specific details are set forth in order to provide a more thorough understanding of the multi-pass slab laser with internal beam shaping. However, it will be apparent to one of ordinary skill in the art that these embodiments may be practiced without these specific details. In other instances, well-known features have not been described in detail to avoid unnecessarily complicating the description.

In general, one or more embodiments of the present disclosure are directed to a multi-pass slab laser with internal beam shaping. In accordance with one or more embodiments, a multi-pass resonator may be formed by folding a stable resonator via one or more folding mirrors thereby creating multiple passes of an intra-cavity laser beam through a lasing medium. In accordance with one or more embodiments, a slab laser configuration is used in which the transverse modes in the narrow axis of the slab are guided by the resonator walls, and the radius of the main front mirror is chosen to match the waist of the stable resonator to the waist of the guide. In accordance with one or more embodiments, the intensity profile of the output beam in the free space axis remains essentially Gaussian, while the size of the waveguide can be chosen so as to achieve a Gaussian-like intensity profile.

In accordance with one or more embodiments, parasitic mode suppression may be used in combination with the internal beam shaping to achieve a highly efficient laser resonator with improved beam quality. In accordance with one or more embodiments, the parasitic mode suppression may be accomplished by one or more parasitic mode suppressors are affixed to, or an integrated part of, one or more extension surfaces, extension members and shields. In accordance with one or more embodiments, mode-suppressing extension surfaces, extension members and shields are located near or adjacent to the mirrors of the resonator. Such embodiments of the present invention take advantage of the fact that the spatial separation between neighboring beams in a multi-pass resonator is greatest at the ends of the resonator, with the end of the resonator being defined by the mirrors. A spatial separation between the beams of the desired oscillation in the area of a parasitic oscillation is implemented so that the placement of the parasitic mode suppression structures serves to effectively suppress the parasitic oscillation while at the same time not substantially affect, or interfere with, the desired laser oscillation.

In accordance with one or more embodiments, the multi-pass slab laser with internal beam shaping may be employed with a number of different types of laser gain media, also referred to herein as lasing media. For example, one or more embodiments of the resonator may employ a gas discharge medium and/or a solid state gain medium.

FIG. 1A shows an example of a laser employing a laser resonator, e.g., a multi-pass laser resonator with internal beam shaping in accordance with one or more embodiments. Before the details of the internal beam shaping and parasitic mode suppression structures are discussed, the general components of the laser shown in FIG. 1A will be discussed. More specifically, FIG. 1A shows one example of laser employing a laser resonator, e.g., multi-pass slab gas laser 101. However, other types of laser resonators may be employed without departing from the scope of the present disclosure. Furthermore, while the examples described herein may show resonator designs that employ a certain number of passes, e.g., 4 passes as shown below in FIG. 3A, 7 passes in FIG. 4A, and 6 passes in FIG. 5A, a resonator employing any number of passes may be used without departing from the scope of the present disclosure.

In accordance with one or more embodiments, the inter-electrode gap 106 is at least partially filled with a laser gain medium that serves as a discharge region. In accordance with one or more embodiments, the discharge region is defined to be the space between the inner surfaces 103a and 105a of the elongated planar electrodes 103 and 105, respectively. As described in further detail below, the inner surfaces 103a and 105a serve as two elongated resonator walls that bound the discharge region, and, in some embodiments, may also serve as waveguiding surfaces for the intra-cavity laser beam in the transverse direction (y-direction). While the example shown in FIG. 1A is a slab laser that employs planar electrodes 103 and 105, any electrode shape is possible without departing from the scope of the present disclosure. For example U.S. Pat. No. 6,603,794, incorporated by reference herein in its entirety, discloses a number of different electrode arrangements, e.g., contoured electrodes, tapered electrodes, and/or annular electrodes may be used.

The slab laser 101 shown in FIG. 1A further includes an optical resonator that is formed between the output coupling mirror 111 and front multi-folding mirror 107. While the optical resonator shown in FIG. 1A is comprised of three mirrors, other configurations may be used without departing form the scope of the present disclosure. Other illustrative examples of optical resonators, showing the beam path of the intra-cavity laser beam through the optical resonators, are shown in FIGS. 2-5 and discussed in more detail below. Furthermore, as described in more detail below in reference to the remaining FIGS. 6-12, one or more embodiments may employ one or more parasitic mode suppressors (not shown) that are positioned within the optical resonator. In addition, in accordance with one or more embodiments, the optics may be mounted to end flanges (not shown) that maintain vacuum integrity while at the same time providing suitable adjustment of the mirror tilt to enable optimum alignment of the constituent mirrors of the optical resonator.

In the slab laser example shown in FIG. 1A, the elongated planar electrodes 103 and 105 are part of an electrical resonator (which itself is part of the laser resonator) such that the inter-electrode gap bounded by the resonator surfaces 103a and 105a serves as a discharge region for the gas lasing medium. For example, such electrodes may have lengths of up to 1 meter, widths of up to 0.5 meters, and inter-electrode gaps on the order of 1-5 mm. However, other embodiments may use dimensions outside this range without departing from the scope of the present disclosure. In accordance with one or more embodiments, when radio frequency (commonly referred to as "RF") power is applied to the gas lasing medium via elongated planar electrodes 103 and 105, a gas discharge forms within the inter-electrode gap 106. As described in more detail below, laser energy builds up within one or more modes, including a fundamental mode, of the optical resonator, eventually forming an intra-cavity laser beam (not shown) that travels back and forth between the output coupling mirror 111 and the other cavity mirrors. Some fraction of the intra-cavity laser beam is transmitted through the output coupling mirror 111 and forms output laser beam 115. Furthermore, as described in more detail below, one or more undesirable higher order lasing modes and/or parasitic lasing modes that might have developed between one or more mirrors within the optical resonator may be suppressed through the use of strategically placed parasitic mode suppressors. If allowed to persist, the parasitic and/or higher order modes may not only decrease the efficiency of the laser but may also decrease the output power and may also negatively affect the quality of the output laser spatial mode.

In the illustrative embodiment shown in FIG. 1A, the electrical resonator cavity, and consequently the gas discharge area, may be rectangularly shaped. However, alternative embodiments may employ a square, annular, or other electrical resonator cavities. The resonator surfaces 103a and 105a may be bare electrode surfaces or may also be plated electrode surfaces. Suitable materials for bare embodiments include metals such as aluminum and other metallic alloys. Plated embodiments may employ a ceramic material, such as alumina or beryllia, on the electrode surfaces.

Figure 1B:
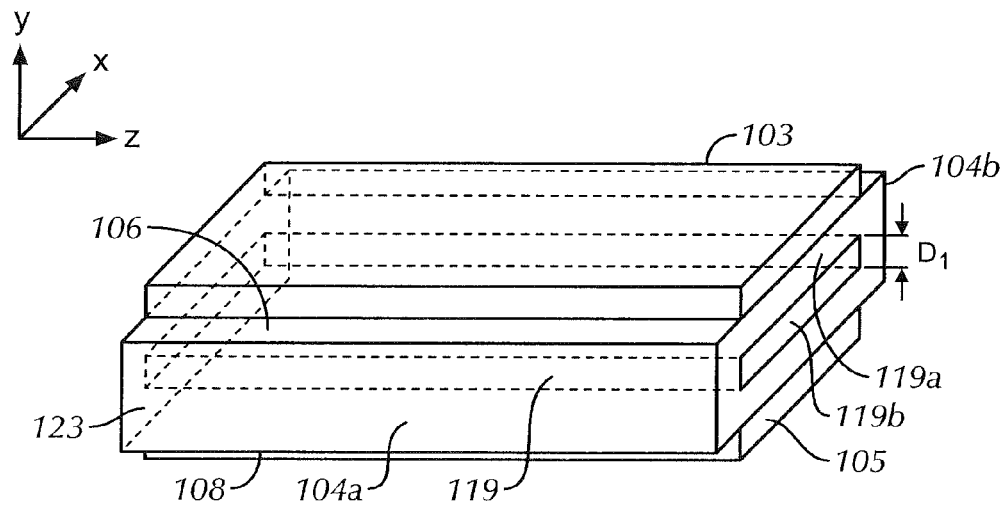

FIG. 1B, shows one example of an electrical resonator in accordance with one or more embodiments. The electrical resonator may be formed from a ceramic body 123 that is sandwiched between the pair of elongated planar electrodes 103 and 105. The ceramic body 123 includes an open-ended inner cavity 119 within which is located the laser gain medium. In this example, the open-ended inner cavity 119 includes elongated sidewalls 104a and 104b that join elongated top wall 106 with elongated bottom wall 208. Similar to the process described above in reference to FIG. 1A, radio frequency power may be applied to a gas lasing medium located within the open-ended inner cavity 119 via the elongated planar electrodes 103 and 105. Consequently, for examples where the laser gain medium is a gas, a gas discharge forms within the semi-closed inner cavity 119. Thus, in this embodiment, the ceramic inner cavity surfaces 119a and 119b form the two elongated resonator walls that bound the discharge region and, in some embodiments, may also serve as waveguiding surfaces for the intra-cavity laser beam in the transverse direction (y-direction).

As alluded to above, in accordance with one or more embodiments, the inter-electrode gap region (or inner cavity region) may be filled with a gas lasing medium. For example, the gas lasing medium may be a mixture of one part carbon dioxide ($CO_2$), one part nitrogen ($N_2$), and three parts helium (He), with the addition of 5% xenon (Xe). The gas pressure may be maintained in a range of approximately 30-150 Torr, e.g., 90 Torr. However, other embodiments may use higher pressures without departing from the scope of the present disclosure. Other embodiments of the invention may use other types of gas lasers, examples of which are listed in Table 1.

TABLE 1

| Type of Laser | Gas Lasing Medium |
| --- | --- |
| Carbon Dioxide | Some mixture of He, $N_2$, $CO_2$ and other gases such as Xe, $O_2$, and $H_2$. |
| Carbon Monoxide | Some mixture of He, $N_2$, CO, and other gases such as Xe, $CO_2$, $O_2$, and $H_2$. |
| Helium Cadmium | Some mixture of including He:Cd, including other inert gases |
| HeNe Lasers | Some mixture of He, Ne, including other inert gases |
| Krypton Ion Lasers | Some mixture of Kr, He, including other inert gases |
| Argon Ion Lasers | Some mixture of Ar, He, including other inert gases |
| Xenon | Xe, including other inert gases |
| Argon Xenon Lasers | Some mixture of Ar, Xe, He |
| Copper Vapor Laser | He/Ne + copper vapor (metal at high temp) + traces of other gases including $H_2$ |
| Barium Vapor Laser | He/Ne + Barium vapor |
| Strontium Vapor Laser | He/Ne + Strontium vapor |
| Metal Vapor Laser | Almost any metal vapor will lase given the right mixture of gases, temperature, and excitation conditions |
| Metal Halide Vapor Lasers | Almost all the above metals will also lase in their respective halide compounds, at lower temperatures, under slightly different excitation conditions |
| Excimer lasers | XeCl, XeF, ArF |
| Chemical lasers | HF, DF |
| Atmospheric lasers | Atmospheric gas |
| Nitrogen lasers | $N_2$, plus others |
| Sulphur, Silicon | Vapors of these elements |
| Iodine, Bromine, Chlorine | Vapors of these elements |
| COIL | Chemical Oxygen Iodine Laser |

Other gas mixtures may be used as well. For instance, some embodiments may use the following gas mixtures, or their isotopes, including portions of neon (Ne), carbon monoxide (CO), hydrogen ($H_2$), water ($H_2O$), krypton (Kr), argon (Ar), fluorine (F), deuterium, or oxygen ($O_2$) and other gases, examples of which are listed in Table 1 above, at various other gas pressures, e.g., 30-120 Torr, e.g., 50 Torr; however, it will be appreciated that other gaseous lasing media may also be employed. For instance, one example of a lasing medium includes one or more of the following vapors: copper, gold, strontium, barium, a halide compound of copper, a halide compound of gold, a halide compound of strontium, a halide compound of barium, and other vapors, examples of which are identified but not limited to those shown in Table 1 above.

Returning to FIG. 1A, in accordance with one or more embodiments, the slab laser 101 includes a power supply 117 that supplies excitation energy to the gas lasing medium located within gap 106 via the first and second elongated planar electrodes 103 and 105, respectively. Accordingly, the addition of excitation energy causes the gas lasing medium to emit electromagnetic radiation in the form of laser beam 115 that ultimately exits the optical resonator by way of output coupling mirror 111. Included with the power supply 117 is a radio frequency generator 117a that applies the excitation energy to the first and second elongated planar electrodes 103 and 105. In accordance with one or more embodiments, the radio frequency generator may operate at a frequency of 81 MHz with an output power level of at least 300 W. Other embodiments may use other excitation frequencies and power levels without departing from the scope of the present disclosure. Furthermore, in accordance with one or more embodiments, the radio frequency generator may be connected to the electrodes in a bi-phase fashion such that the phase of the voltage on one of the first and second elongated planar electrodes 103 and 105 is shifted substantially 180 degrees relative to the voltage on the other of the first and second elongated planar electrodes 103 and 105. The bi-phase excitation may be accomplished by any technique known in the art, e.g., by the placement of inductors between the first and second electrodes. In accordance with one or more alternative embodiments, the radio frequency generator may be connected to one of the first and second elongated planar electrodes, such that only one of the first and second elongated planar electrodes is excited.

The excitation energy supplied by the power supply 117 in the embodiment shown in FIG. 1A may be radio frequency energy, but may also be associated with microwave, pulsed, continuous wave, direct current, or any other energy source that may suitably stimulate a lasing medium into producing laser energy. Furthermore, additional embodiments may utilize other forms of excitation including an optically pumped solid-state laser gain medium similar to that shown in FIG. 1C. In this example, the solid state material 125 may be excited by way of a flashlamp (not shown) or laser diode (not shown).

In accordance with one or more embodiments, the inner surfaces 103a and 105a of the first and second elongated planar electrodes 103 and 105, respectively, are positioned sufficiently close to each other so that the inter-electrode gap acts as a waveguide along the y-axis for the laser radiation. As shown in FIG. 1B, this inter-electrode gap may also be defined by the gap between the ceramic surfaces 119a and 119b. Likewise, in the case of the solid state gain medium shown in FIG. 1C, the width of the inter-electrode gap may be defined by the thickness of the solid state gain medium 125. In any of these cases, the inner waveguiding surfaces also act as optical resonator surfaces in the transverse direction (y-direction). In accordance with one or more embodiments, waveguiding occurs when $\pi N<1$, where $N=D^2/(4\lambda L)$ is the Fresnel number of the guide and D is the width of the gap between the surfaces, L is the length of the optical cavity, and $\lambda$ is the wavelength of the laser radiation. For a wavelength of about 10.6 microns, which is a common wavelength produced by a $CO_2$ laser, the waveguiding criterion is satisfied if the inter-electrode gap is less than 2 mm for a guide length of 40 cm. However, in other embodiments, the inter-electrode gap is large enough to allow for free space propagation, e.g., Gaussian beam propagation, of the laser beam in the y-direction. Accordingly, in this free space configuration, these surfaces serve to define the thickness of the gas discharge region without acting as a waveguide for the laser radiation. Other embodiments may use an inter-electrode gap that is between the waveguiding criterion and complete free space propagation.

Figure 1C:
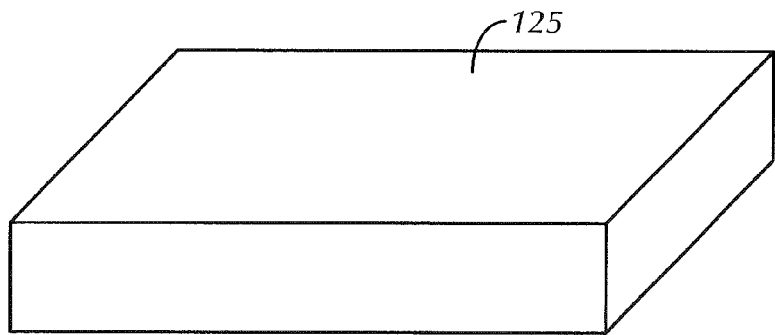
Figure 2A:
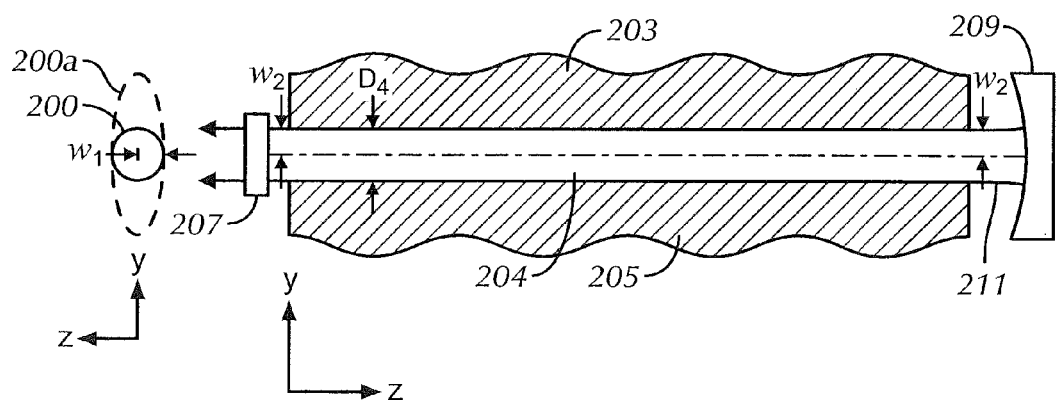
FIGS. 2A-2B show examples of a multi-pass slab resonator with internal beam shaping in accordance with one or more embodiments of the invention.

FIG. 2A shows a cross-sectional view of a slab resonator in accordance with one or more embodiments. In FIG. 2A the slab resonator is shown cut in the y-z plane relative to the perspective view shown in FIGS. 1A-1C and in FIG. 2B the slab resonator is shown cut in the x-z plane relative to the perspective view shown in FIGS. 1A-1C. The gap 204 between the two resonator walls 203 and 205 has a width D4 and contains a lasing medium, e.g., a gas discharge medium or a solid state gain medium. As described above, the resonator walls may be the walls of a pair of planar electrodes, either bare or plated, and/or walls within an open ended inner cavity of a ceramic resonator structure as shown in FIGS. 1A and 1B, respectively. Alternatively, in accordance with one or more solid-state embodiments, the resonator walls may comprise the interface between the solid-state gain medium and a region of lower refractive index, such as layers of non-doped material or the gaseous environment, as shown in FIG. 1C. In accordance with one or more embodiments, an optical resonator may be formed between at least two mirrors that are spaced apart from one another in the longitudinal direction (the z-direction), e.g., mirrors 207 and 209, in FIG. 2A. The intra-cavity laser beam 211 may traverse the lasing medium (not shown) one or more times as described below in reference to FIGS. 3-5.

In accordance with one or more embodiments, the distance D4 may be smaller than the $e^{-2}$ intensity width of the fundamental free space mode in the region of the resonator walls (i.e., smaller than the so-called "free space requirement") such that the modes in the narrow axis (i.e., y-axis) are waveguide in nature. In accordance with one or more embodiments, the cooling of the gain medium improves the smaller D4 becomes and, for gas lasers, a small D4 allows for higher gas pressures. For example, in accordance with one or more embodiments, D4 may range between 1 mm and 4 mm, although smaller and larger values of D4 may be used without departing from the scope of the present disclosure. One or more embodiments may employ a so-called hybrid resonator configuration where waveguide propagation occurs in the y-direction and free space propagation occurs in the x-direction. In accordance with one or more embodiments, the distance D4 may be chosen to allow free space propagation (not shown) of the intra-cavity laser beam 211 in the narrow axis of the slab structure (the y-axis, i.e., the axis that is parallel to the gap).

In embodiments that employ a hybrid configuration, without internal beam shaping, the output laser transverse beam profile 200a (the cross section of the output beam) may be highly asymmetric, i.e., the size of the beam in the y-direction may be much larger than the size of the beam in the x-direction. To improve the symmetry of the output beam profile, internal beam shaping may be employed in accordance with one or more embodiments to achieve the highly symmetric beam profile 200, e.g., the circular beam profile 200 shown in FIG. 2A, without the need for beam shaping optics that are external to the optical resonator mirrors. More specifically, profile 200 shows an example of the intra-cavity laser spot that is present on the mirror 207 (which is the output coupler mirror in this embodiment) when internal beam shaping is employed in accordance with one or more embodiments.

Returning to FIG. 2A, the transverse size of the beam within the resonator is determined by the separation between the waveguiding resonator walls 203 and 205. For example, in the transverse y-direction, a beam waist of the intra-cavity beam 211 occurs at both ends of the waveguide and is determined by the bore size D4. In FIG. 2A, the radius of the beam in the y-direction at the beam waist is $w_2$. In the free space transverse direction, x-direction (pointing out of the page), the beam 211 is formed as a fundamental mode of the stable resonator with beam radius $w_1$ at the location of the beam waist, which occurs at the surface of the output coupling mirror 207 in embodiments that employ a planar output coupling mirror, as shown in FIG. 2B.

Figure 2B:
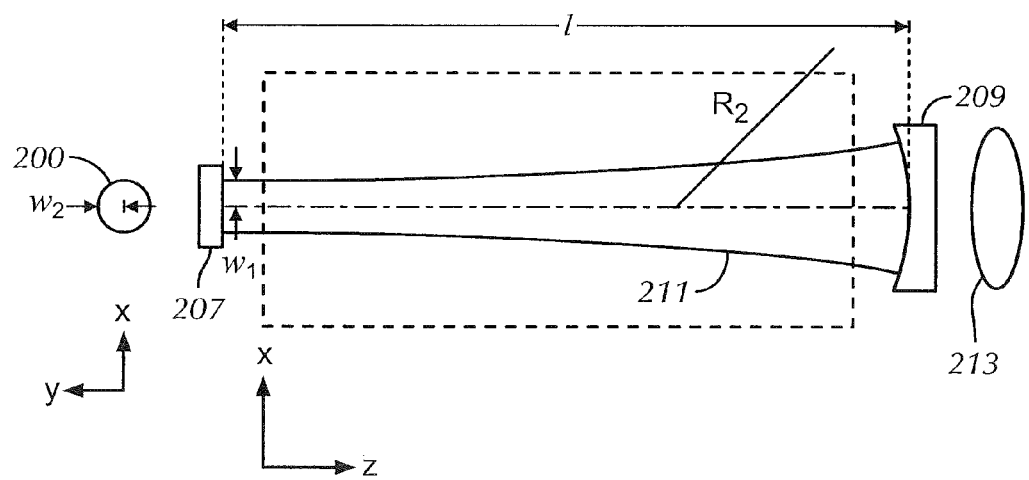

FIG. 2B shows a cross-sectional view in the x-z plane of the hybrid resonator of FIG. 2A. As used herein, the x-direction is also referred to as the free space transverse direction because the intra-cavity laser beam 211 propagates as it would in free space rather than as a waveguide mode, as is the case for the propagation in the y-direction. FIG. 2B shows the transverse profile of the intra-cavity laser beam 211 at each mirror 207 and 209 for a configuration with $R_2$ for mirror 309 chosen such that $w_1=w_2$. In accordance with one or more embodiments, the radius of curvature $R_2$ of the curved mirror 209 of the stable resonator is chosen such that the free space waist size $w_1$ is equal to the waveguide waist size $w_2$. Choosing $R_2$ such that $w_1=w_2$ ensures that the transverse profile 200 of the intra-cavity laser beam 311 will be very nearly symmetric at the location of the flat mirror 207 and also ensures that the output beam will be anastigmatic.

While the separation between the mirrors is equal to a length l, the total length of the stable resonator, i.e., the total intra-cavity optical path length between the curved mirror 209 and the planar mirror 207 on which the resonator waist $w_1$ resides, may be larger than l. For example, in accordance with one or more embodiments, one or more flat turning mirrors may cause the intra-cavity laser beam to traverse the gain medium N times leading to a resonator having a total length L=Nl. Any number of intervening flat optical elements can occur between the mirrors 207 and 209 that define the stable resonator. For example, the mirror 311 shown in the multipass resonator embodiments shown in FIGS. 3A-3B may be used to fold the beam path and thus, allow for more passes of the intra-cavity laser beam through the lasing medium.

In accordance with one or more embodiments, for a properly chosen gap width D4, the intensity profile of the output beam in the waveguide direction can be made Gaussian-like, as in the free space direction. For example, the fundamental mode in the waveguide direction in rectangular symmetry may be approximated by a Gaussian beam with a waist of $w_2 \approx 0.7a$, where 2a is equal to the gap width D4. Thus, in accordance with one or more embodiments, for a given free space waist $w_1$ occurring at the end of the waveguide, D4 may be chosen to satisfy $w_2 \approx 0.7(D4/2)$. However, other widths may be used without departing from the scope of the present disclosure. In general, the free space waist size $w_1$ of a stable resonator defined by a mirror with radius of curvature $R_1$ and a mirror with radius of curvature $R_2$ is given by the Gaussian beam equation $$w_1^2 = \frac{L\lambda}{\pi} \sqrt{\frac{g_1 g_2 (1 - g_1 g_2)}{(g_1 + g_2 - 2g_1 g_2)^2}} \quad (1)$$

where $g_1=1-L/R_1$, $g_2=1-L/R_2$, L is the resonator length, and $\lambda$ is the wavelength of the laser radiation. As described above, in determining the stable resonator length L, any flat optical elements occurring between the mirrors are ignored, as such optical elements do not transform the beam profile. However, also as described above, if one mirror is chosen to be flat, such that $R_1=\infty$, $w_1$ will occur at one end of the resonator. In such a case, $g_1=1$, and the equation may be simplified. To this end and in accordance with one or more embodiments, free space waist $w_1$, the stable resonator length L, and the radius of curvature $R_2$ of the curved mirror are related through the Gaussian beam equation $$w_1^2 = \frac{L\lambda}{\pi} \sqrt{\frac{g_2(1-g_2)}{(1+g_2-2g_2)^2}} \qquad (2)$$

In accordance with one or more embodiments, the internal beam shaping involves choosing the values of $w_1$, L, and $R_2$ to yield a symmetric beam, i.e., a beam having $w_1 \approx w_2$.

Figure 3A:
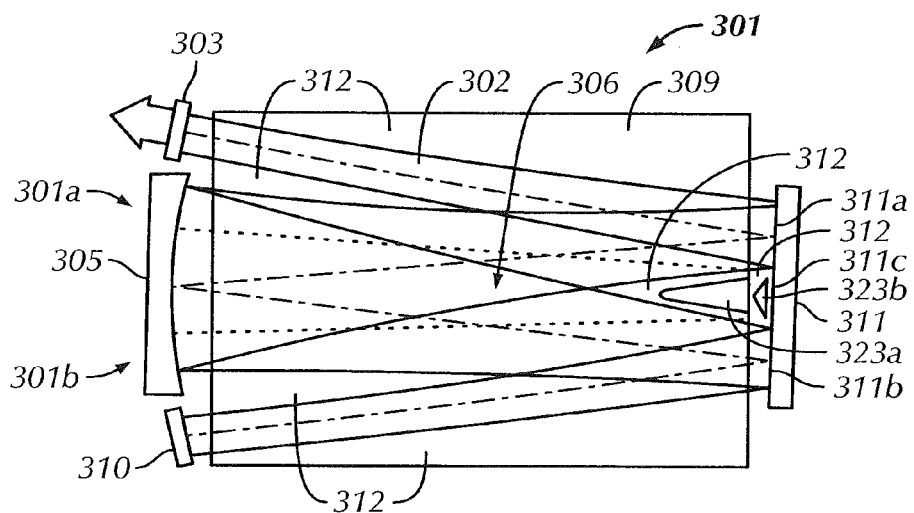
FIGS. 3A-3B show an example of a slab resonator in accordance with one or more embodiments of the invention.

FIG. 3A shows a multi-pass laser resonator with internal beam shaping in accordance with one or more embodiments. The illustrative example shown in FIG. 3A is a multi-pass resonator that is formed by combining two folded stable resonators 301a and 301b. The intra-cavity laser beam 302 passes through the lasing medium 309 a total of four times in this embodiment. Folded stable resonator 301a is formed between an output-coupling mirror 303 and a front multi-folding mirror 305. Likewise, folded stable resonator 301b is formed between the main front multi-folding mirror 305 and satellite mirror 310. In accordance with one or more embodiments, the two folded stable resonators 301a and 301b share a common rear multi-folding mirror 311, thereby allowing for a reduction in the complexity of the optical alignment process. In accordance with one or more embodiments, the intra-cavity laser beam 302 may oscillate in the fundamental mode of the resonator formed by the cascaded arrangement of stable resonators 301a and 301b. Although not shown in this view, in the transverse direction the lasing medium and intra-cavity beam may be bounded by two waveguiding surfaces as shown above in FIG. 2A.

In accordance with one or more embodiments, in order to improve symmetry and prevent instability of the entire multi-pass resonator, the radius of curvature R of the output-coupling mirror 303 may be chosen to be approximately equal to the radius of curvature of the satellite mirror 310. For example, in one illustrative embodiment, the output-coupling mirror 303 and satellite mirror 310 are both flat (R=∞) so that the waist of the intra-cavity laser beam 302 occurs at either end of the multi-pass resonator, i.e., at the output-coupling mirror 303 and at the satellite mirror 310. However, in accordance with one or more embodiments, a waist may occur at any mirror and/or between mirrors within the folded resonator without departing from the scope of the present disclosure. Examples of such alternative embodiments are discussed in more detail below in reference to FIGS. 4-5.

Returning to FIG. 3A, in accordance with one or more embodiments, due to the use of the common rear multi-folding mirror 311, a secondary stable resonator is formed between the main front multi-folding mirror 305 and the common rear multi-folding mirror 311. This secondary stable resonator leads to the formation of parasitic mode 306 (delimited by the dotted line in FIG. 3A). In accordance with one or more embodiments, the alignment of the mirrors of the multi-pass resonator 301 is configured such that the parasitic mode 306 overlaps one or more superfluous regions 312. As used herein the term superfluous region refers to a portion of the resonator that is not traversed by the intra-cavity laser beam and thus is not necessary for lasing to occur.

In the example shown in FIG. 3A, the intra-cavity laser beam 302 impinges upon the outer portions 311a and 311b of the common turning mirror 311, but does not impinge upon either the center portion 311c of the common turning mirror 311 or the superfluous region 312 of the lasing medium 309 that is near the central portion 311c. Furthermore, this alignment places the center portion 311c of the common turning mirror precisely at a position where the parasitic mode 306 will develop. However, at least with respect to the intra-cavity laser beam 302, center portion 311c of the common turning mirror and region 312 of the lasing medium may be considered superfluous regions because these regions are unnecessary for the proper oscillation of the fundamental mode of the cavity represented by the intra-cavity laser beam 302.

In accordance with one or more embodiments, one or more mode suppressing structures 323a and 323b may be located inside the laser gain medium 309 and outside the laser gain medium 309, respectively. For example, the mode suppressing structures may be located inside and/or outside the inter-electrode gap, as described in more detail below in reference to FIGS. 7-12. In other embodiments, one or more other mode suppressors may also be located in any superfluous region that is not traversed by the fundamental mode of the cavity represented by the intra-cavity laser beam 302 and thus, the positioning of the mode suppressing structures need not be limited to positions that correspond to the locations of parasitic modes. For example, mode suppressing structures may be located within any of the superfluous regions 312 shown in FIG. 3A.

Figure 3B:
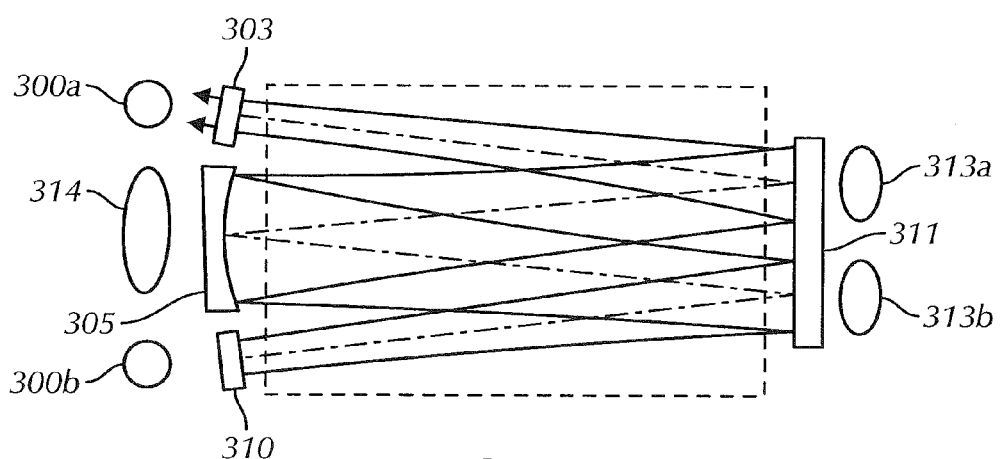

FIG. 3B shows the shape of the intra-cavity laser beam spot at the location of the various mirrors in accordance with one or more embodiments. As described above in reference to FIGS. 2A-2B, with a proper choice of the radius of curvature R2 of curved mirror 305, the laser spot 300a on the output mirror 303 may be made to be substantially symmetric even though the spots 313a and 313b, located on turning mirror 311, and spot 314, located on curved mirror 305, may all be highly asymmetric. In accordance with one or more embodiments, if $\in_1$ is the larger of the two beam widths in the x-axis ($w_1$) and y-axis ($w_2$) of the output beam profile 300a and $\in_2$ is the smaller of the two beam widths in those axes, then the aspect ratio $\in_1/\in_2$ may be $1 \le \in_1/\in_2 \le 1.2$, which is often may be an adequate level of symmetry for use in laser applications without the need for external beam shaping. However, other aspect ratios outside of this range may be employed without departing from the scope of the present disclosure.

In the embodiment shown in FIGS. 3A-3B, the intra-cavity laser beam passes through the gain medium 4 times; however, the stable resonator 301a defined at one end by the output coupling mirror 303 only consists of the upper two passes. Thus, the total resonator length used for internal beam shaping at the output is L=2l and, for a given gap D4, internal beam shaping may be accomplished by employing a curved mirror 305 having a radius of curvature R2 that satisfies equation (2) for L=2l, i.e., R2 is chosen so that $w_1 \approx w_2$.

Figure 4A:
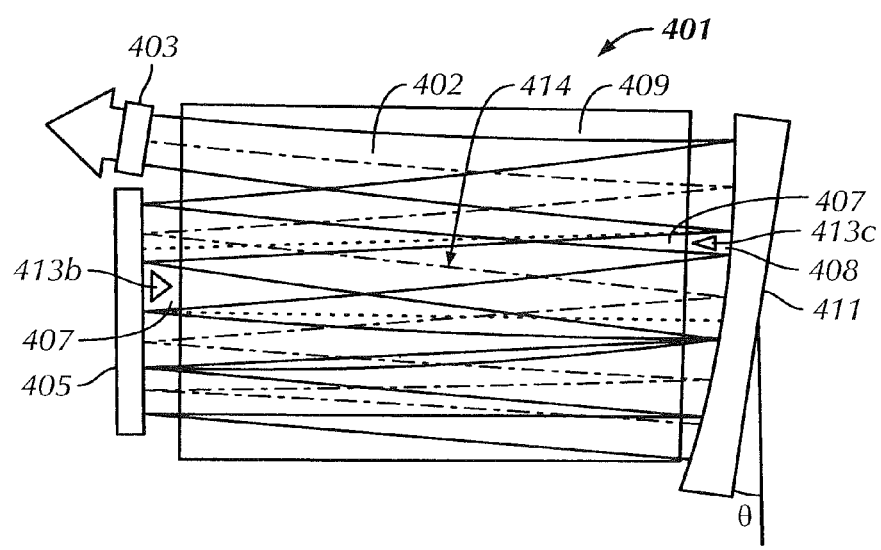
FIGS. 4A-4B show an example of a slab resonator in accordance with one or more embodiments of the invention.
Figure 4B:
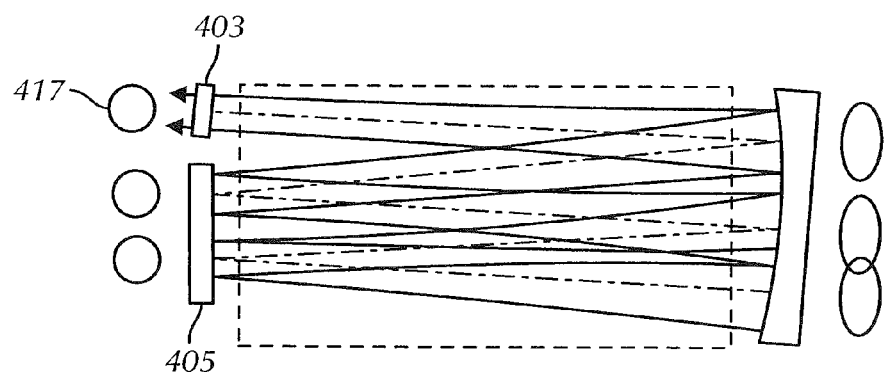

FIGS. 4A-4B show a stable multi-pass slab resonator 401 that may be used as the optical resonator discussed above in reference to FIGS. 2A-2B in accordance with one or more embodiments of the invention. FIG. 4A shows an optical resonator that is formed between the output coupling mirror 403 and the front multi-folding mirror 405. One or more superfluous regions 407 may be made to overlap with at least a portion of a parasitic laser mode (not shown). Furthermore, the partial spatial overlap of the parasitic laser mode with the superfluous region 407 may be accomplished by tilting the rear multi-folding mirror 411 by the angle θ. In the multi-pass resonator 401 shown in FIG. 4A, the formation of parasitic mode may be suppressed by the presence of a parasitic mode suppressor 413b and/or 413c within at least a portion of the superfluous regions 407. As before, the intra-cavity laser beam 402 traverses the laser gain medium 409 a number of times, e.g., seven times in the embodiment shown in FIG. 4A. Likewise, a number of superfluous regions may exist, e.g., superfluous regions 407 and 408 exist in the resonator and thus, may be used for parasitic mode suppression. However, rather than employing parasitic mode suppressors located within the portion of the superfluous area 407 that is within the lasing medium 409, as shown above in FIG. 3A, the formation of parasitic mode 414 (shown as bounded by the dotted lines in FIG. 4A) is suppressed by mounting parasitic mode suppressors 413b and 413c outside of the gain medium 409, e.g., by attaching the parasitic mode suppressors to respective extension members (not shown) that themselves may be attached, e.g., to the longitudinal ends of the resonator walls. While two parasitic mode suppressors are shown in this embodiments, any number of parasitic mode suppressors (including only one) may be used without departing from the scope of the present disclosure. The parasitic mode suppressor 413b may be mounted between the extension members 127 and 129, and the parasitic mode suppressor 413c may be mounted between extension members 131 and 133, as shown above in reference to FIG. 1A. In accordance with one or more embodiments, the extension member parasitic mode suppressors may, or may not, cause waveguiding of the intra-cavity laser beam 402 in the transverse dimension. Several other examples of parasitic mode suppressors are described in more detail below in reference to FIGS. 6-12.

FIG. 4B shows a resonator arrangement that is nearly identical to that shown in FIG. 4A, except that the design of the resonator allows for 5 passes instead of 7. In this example internal beam shaping is employed to ensure a symmetric spot 417 on the output coupling mirror 403. In this design, the waist of the intra-cavity laser beam occurs at the surface of the output coupler 403 and also at the surface of the turning mirror 405 upon each reflection. In other words, the beam expands from the waist position at the surface of output coupling mirror until it hits the curved mirror 411 where it is reflected and refocused such that the waist again occurs on the surface of the turning mirror 405. This process is effectively repeated for any number of passes through the gain medium 409 and is only limited by size constraints of the optics themselves. However, in both examples shown in FIGS. 4A-B, the stable resonator defined at one end by the output coupling mirror 403 only consists of the uppermost pass. Thus, despite seven passes as shown in FIG. 4A and five passes as shown in FIG. 4B, internal beam shaping is accomplished with a path length L=1. As before, for a given gap D4, internal beam shaping may be accomplished by employing a curved mirror 411 having a radius of curvature R2 that satisfies equation (2) for L=1, i.e., R2 is chosen so that $w_1 \approx w_2$.

Figure 5A:
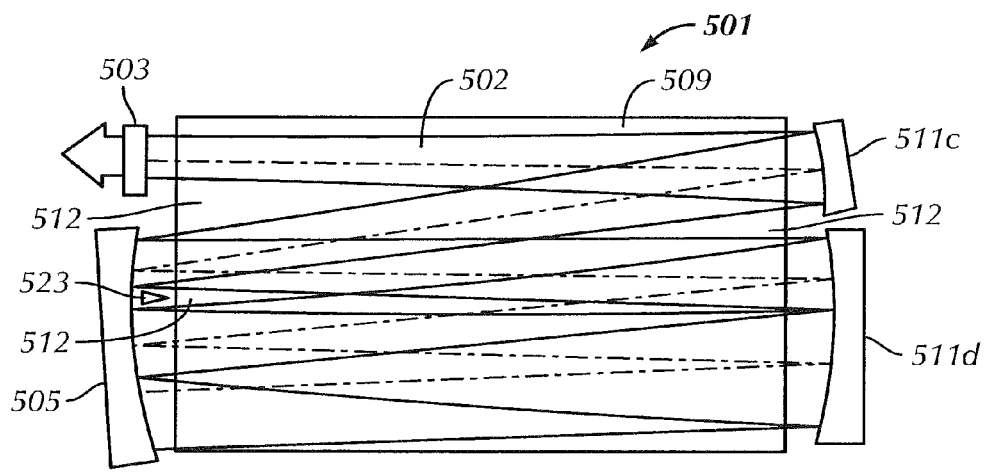
FIGS. 5A-5C show an example of a slab resonator in accordance with one or more embodiments of the invention.
Figure 5B:
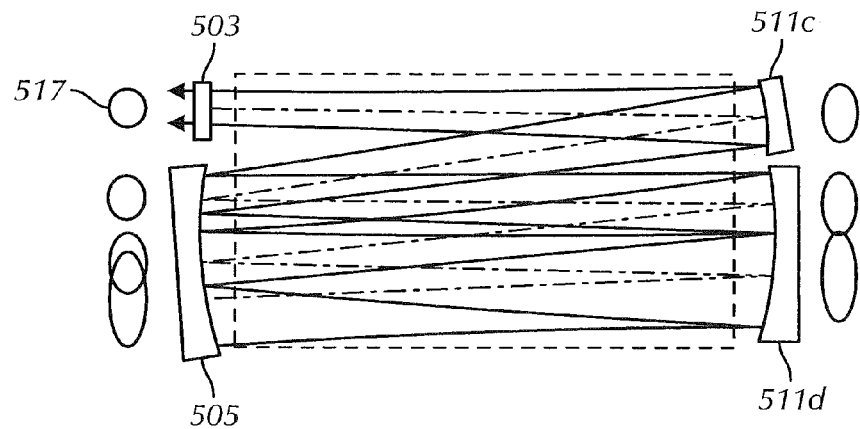

FIG. 5A-5B shows another example of a multi-pass a resonator 501 in accordance with one or more embodiments. In the example shown, such an arrangement results in a total of six passes of the intra-cavity laser beam 502 through the lasing medium 509; however, fewer passes or more passes than shown may be used without departing from the scope of the present disclosure. The example shown in FIGS. 5A-5B is similar to that shown in FIGS. 4A-4B but with a modification that the resonator utilizes two rear folding mirrors 511c and 511d in place of the single folding mirror 311 of FIGS. 4A-4B and that a curved mirror 505 is used in place of the flat folding mirror 305, although a flat folding mirror may still be used without departing from the scope of the present disclosure. Thus, in this embodiment, the multi-pass optical resonator 501 is formed between the output coupling mirror 503 and front multi-folding mirror 505. As before, the intra-cavity laser beam 502 traverses the laser gain medium 509 a number of times, e.g., six times in the embodiment shown in FIGS. 5A-5B. Likewise, a number of superfluous regions may exist, e.g., superfluous regions 512 exist in the resonator and thus, may be used for parasitic mode suppression, e.g., by placing parasitic mode suppressor 523 outside of the gain medium 509, e.g., by attaching the parasitic mode suppressors to respective extension members (not shown) that themselves may be attached, e.g., to the longitudinal ends of the resonator walls. While one parasitic mode suppressor is shown in this embodiment, any number of parasitic mode suppressors may be used without departing from the scope of the present disclosure. In accordance with one or more embodiments, the parasitic mode suppressor 523 may be mounted between extension members 127 and 129, as shown above in reference to FIG. 1A. In accordance with one or more embodiments, the extension member parasitic mode suppressors may, or may not, cause waveguiding of the intra-cavity laser beam 502 in the transverse dimension. Several examples of parasitic mode suppressors are described in more detail below in reference to FIGS. 6-13.

FIG. 5B shows several cross-sections of the intra-cavity laser beam at the location of the various mirrors in accordance with one or more embodiments. Similar to FIGS. 4A-B, the stable resonator involving the output coupling mirror consists of only one pass: the pass defined at one end by the output coupling mirror 503 and the opposing rear mirror 511c. Thus, internal beam shaping for the output beam is accomplished with a path length L=1. As before, for a given gap D4, internal beam shaping may be accomplished by employing a curved mirror 511c having a radius of curvature R2 that satisfies equation (2) for L=1, i.e., R2 is chosen so that $w_1 \approx w_2$. It should be noted, however, that the beam size behavior of all other passes within the resonator remains unconstrained so long as this condition at the output is satisfied. For example, the transformation of a Gaussian beam follows the ABCD law of Gaussian optics, and if the ray transfer matrix of an optical element, e.g., a curved mirror, is given by $$M = \begin{pmatrix} A & B \\ C & D \end{pmatrix} \quad (3)$$

then, for C≠0, the waist is transformed by the optical element according to the equation $$w_1'^2 = w_1 \left( \frac{Cz' + A}{Cz + D} \right) \quad (4)$$

where w'$_1$ is the new waist size, z is the initial location of the waist relative to the optical element, and z' is the new location of the waist relative to the optical element. The new waist location z' is given by $$z' = -\frac{(Az+B)(Cz+D) + ACz_0^2}{C^2 z_0^2 + (Cz+D)^2} \quad (5)$$

In equation (5), $z_0$ is the initial Rayleigh range and equal to $\pi w_1 / \lambda$. For a mirror with radius of curvature R, the ray transfer matrix is $$M = \begin{pmatrix} 1 & 0 \\ -\frac{2}{R} & 1 \end{pmatrix} \quad (5)$$

Reapplying the transformations to the new waist size and locations can then describe the beam's behavior upon encountering subsequent optical elements, e.g., curved mirrors 505 and 511d in FIGS. 5A-5B. Consequently, the beam spot size in the free space axis can vary in a controlled manner throughout the resonator, as shown in FIG. 5B, so long as the transformation returns the beam to the condition satisfied by equation (2), i.e., R2 is chosen so that $w_1 \approx w_2$, and the output beam is still highly symmetric.

Figure 5C:
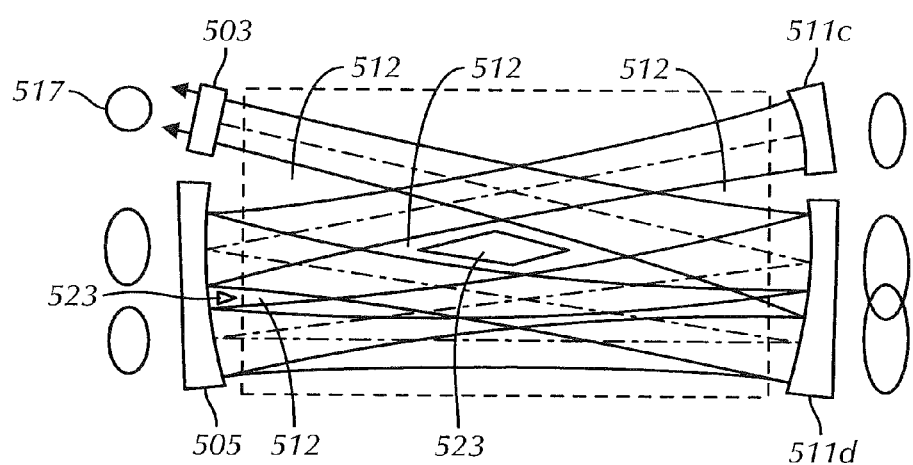

It will be appreciated from the foregoing discussions that different total pass numbers and path geometries are possible within a given optical system. For example, FIGS. 4A-4B depict two different total pass numbers, e.g. seven and five, arising from a three-mirror system, e.g., with two mirrors disposed at one end of the resonator (mirrors 403 and 405) and one mirror disposed at the opposing end (mirror 411). In accordance with one or more embodiments, differences in total pass numbers and/or path geometries may be achieved through differences in alignment, resonator dimensions, and/or radii of curvature of the different mirrors. In accordance with one or more embodiments, the stable resonator formed by the output coupling mirror and the curved mirror may have a length $10 \text{ cm} \leq L \leq 1 \text{ m}$; the radius of curvature of the curved mirror may be $200 \text{ mm} \leq R2 \leq 2000 \text{ mm}$; and the gap width D4 may be $1 \text{ mm} \leq D4 \leq 5 \text{ mm}$. However, by employing the use of equations (1)-(5) the internal beam shaping may be employed to achieve For example, FIG. 5C shows a resonator that employs a different number of passes, e.g., five passes, and path geometry that can be achieved with the four-mirror system used in FIGS. 4A-B. However, any total number of passes, e.g. seven, nine, or eleven, may be used without departing from the scope of the present disclosure. As shown in FIG. 5C, in accordance with one or more embodiments, the last pass of the intra-cavity beam 502 involves the rear mirror 511c that opposes the output coupling mirror 503. As described above, the beam spot size on the mirrors 505 and 511d may change in a controlled manner as the beam travels through the resonator; however, the output condition for a highly symmetric output beam 517 is still satisfied. In accordance with one or more embodiments, one or more superfluous regions 512 may also exist where one or more parasitic mode suppressors 523 may be located.

In accordance with one or more embodiments, the parasitic mode suppressors may be substantially the same shape as the a superfluous region, e.g., the parasitic mode suppressor may have a substantially triangular shape. The parasitic mode suppressors may be made out of a metal material, such as aluminum, or a ceramic material, such as alumina, or any combination thereof. Furthermore, metallic parasitic mode suppressors may be anodized or non-anodized. In accordance with one or more embodiments, a parasitic mode suppressor made out of reflective material may be shaped so as to reflect light away from a parasitic oscillation. Generally, the material(s) used for the parasitic mode suppressor may absorb, scatter, or deflect light that would otherwise contribute to a parasitic mode, without interfering with proper laser operation. Several examples of these intra-cavity parasitic mode suppressors are described below in reference to FIGS. 6-13 described in more detail below.

In accordance with one or more embodiments, the presence of one or more mode suppressing structures suppresses gain of the resonator with respect to the parasitic mode and thus increases the overall efficiency of the laser resonator with respect to the fundamental mode. Furthermore, the presence of one or more mode suppressing structures may also inhibit higher-order modes of the resonator, thereby improving the efficiency and output mode quality of the laser resonator. Additionally, for the case of a gas discharge laser that includes a gain region that is located within two elongated electrodes as described above, the presence of the mode suppressing structures may be used to tune desired electrical properties in the cavity, e.g., to achieve a higher capacitance between the resonator walls or, for gas discharge lasers, higher field areas facilitating a discharge.

In all the examples that follow in FIGS. 6-13, a parasitic mode suppressor may be formed by a recess in, and/or a protrusion on, a resonator wall of the resonator. For example, the wall on which a parasitic mode suppressor is located may be one or more inner surfaces of the first and second elongated planar electrodes that bound the inter-electrode gap, like that shown in FIG. 1A. In other examples, the resonator wall on which a parasitic mode suppressor is located may be one or more inner surfaces that bound an open-ended inner cavity of a ceramic body, like that shown in FIG. 1B. In other embodiments using a solid-state gain medium, the parasitic mode suppressor may be embedded in the solid-state medium, with or without a surface of the parasitic mode suppressor being coplanar with one or more resonator wall surfaces.

Figure 6A:
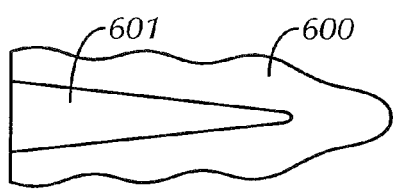
FIGS. 6A-6E show parasitic mode suppressors in accordance with one or more embodiments of the invention.
Figure 6B:
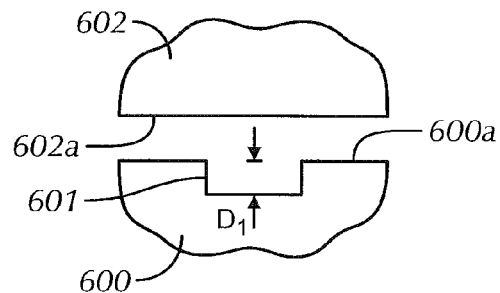

FIG. 6A shows a top view of resonator 600 having a parasitic mode suppressor 601 formed as a triangular-shaped recess in the wall of resonator 600. While the recess shown in FIG. 6A is triangular in shape, any shape may be used without departing from the scope of the present disclosure. FIG. 6B shows a cross-sectional view of the same recess-type parasitic mode suppressor 601. In the example shown in FIG. 6B, the recess-type parasitic mode suppressor 601 is formed on resonator wall 600a. In other embodiments, a recess may alternatively be formed in the opposing resonator wall, e.g., in resonator wall 602a.

Figure 14:
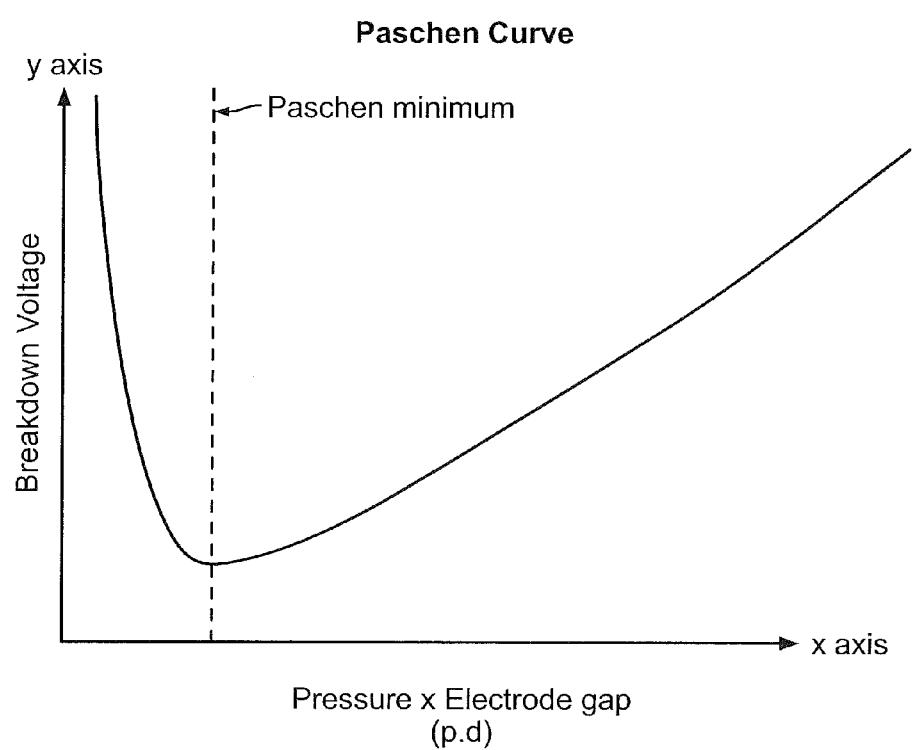
FIG. 14 shows a Paschen curve.

In embodiments that employ a gaseous gain medium, e.g., in gas discharge laser embodiments, the depth D1 of the recess-type parasitic mode suppressor 601 may be chosen to substantially reduce, or even eliminate, the gas discharge in the area of the recess. In other words, the presence of the recess-type parasitic mode suppressor 601 acts to substantially reduce, or even eliminate gas discharge in the superfluous region. The minimum depth D1 needed to suppress the gas discharge depends on the technical details of how the electrical excitation of the lasing medium is provided and also depends on the type and composition of the gaseous mixture that is used as the lasing medium within the discharge region. For example, the breakdown voltage may be described as depending on the product of gap size and gas pressure and generally follows what is known as the Paschen Curve, an example of which is shown in FIG. 14. Accordingly, for a given gas pressure, the minimum depth D1 should be chosen such that the breakdown voltage of the inter-electrode gap plus D1 always exceeds the excitation voltage available in the resonator structure. For example, the depth D1 may be chosen to be at least equal to the inter-electrode gap, thereby making an effective gap that is at least twice the inter-electrode gap, although any appropriate depth may be chosen without departing from the scope of the present disclosure. For example, for an inter-electrode gap of 2 mm, a minimum depth of 2 mm may be chosen, for a full gap of 4 mm.

The substantial reduction and/or elimination of gas discharge in the superfluous region leads to a corresponding substantial reduction and/or elimination of the gain in the superfluous region. Consequently, without an effective gain medium in the superfluous region, the parasitic oscillation, e.g., parasitic oscillation 306 shown in FIG. 3A (or parasitic oscillation 414 in FIG. 4A), may be prevented from establishing itself inside the resonator.

In accordance with one or more embodiments, the recess-type parasitic mode suppressor 601 may also be sized so as to eliminate the gain available to higher-order modes of the desired oscillation. For gas discharge lasers in which modes perpendicular to the resonator walls are waveguide in nature, the presence of recess-type parasitic mode suppressor 601 disperses any oscillation passing above the area of recess-type parasitic mode suppressor 601, thereby additionally increasing the losses for a parasitic oscillation and any higher-order modes. For example, in the case of Gaussian beam propagation in rectangular symmetry, the beam radius of a higher-order mode is greater than that of the fundamental mode by a factor of sqrt(2 m+1), where m=1 is the first higher-order mode, m=2 is the second high-order mode, etc. Therefore, in order to inhibit certain higher-order modes (m>1), the size of the parasitic mode suppressor should be chosen such that it is large enough to obstruct the beam radius of the higher-order modes but not the fundamental mode (m=0).

Figure 6C:
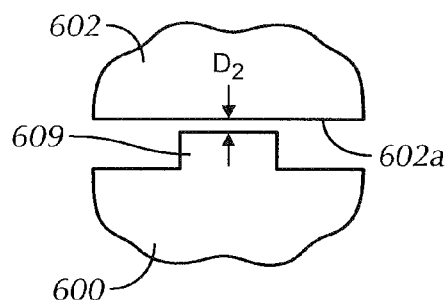
Figure 6D:
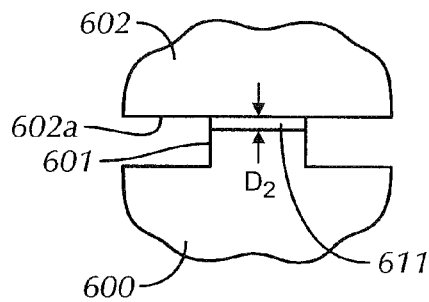

In accordance with one or more embodiments, the parasitic mode suppressor may be a protrusion on the resonator wall as shown in the cross-sectional view of FIG. 6C. Such a protrusion-type parasitic mode suppressor 609 may be formed as part of the inner surface 600a of the resonator wall 600. In an embodiment where the protrusion-type parasitic mode suppressor 609 is formed directly as part of the surface of an electrode, e.g., elongated electrode 103 and 103 shown in FIG. 1A, a distance D2 may separate the protrusion-type parasitic mode suppressor 609 from the opposing surface 602a of resonator wall 602 in order to prevent an electrical short from occurring between the electrodes. In addition, as shown in FIG. 6D, a layer 611 of an electrically insulating material may be disposed between the protrusion-type parasitic mode suppressor 609 and the opposing surface 602a. In other embodiments, as shown in FIG. 6E, a layer 613 of an electrically insulating material may be partially inserted into a recess 615 in the opposing wall.

Figure 6E:
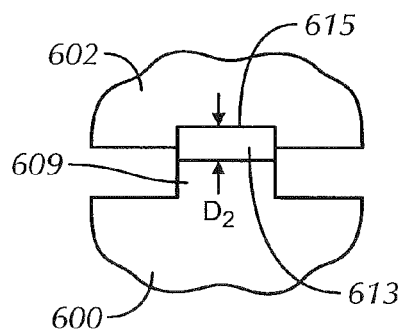

In gas discharge lasers, a protrusion-type parasitic mode suppressor 609 as shown in FIGS. 6C-6E may also serve to suppress unwanted gas discharge if the separation distance D2 is smaller than a certain value. The maximum separation distance D2 needed to suppress a discharge depends on the excitation of the lasing medium. Referring to the Paschen Curve shown in FIG. 14, the maximum separation distance D2 can be understood as the value occurring to the left of the Paschen minimum above which the breakdown voltage exceeds the excitation voltage available in the resonator structure. The maximum separation distance D2 can be further understood as the distance beyond which the combined thickness of the ion sheaths surrounding the gas plasma discharge is no longer less than the separation distance D2. In accordance with one or more embodiments, the thickness of the ion sheaths depends on the excitation frequency of the lasing medium. For an excitation frequency of 81 MHz, a maximum separation distance of 0.3 mm is typical.

In view of the above, the protrusion-type parasitic mode suppressor 609 may improve laser efficiency, as described above in reference to FIGS. 6A-6B. Furthermore, improved beam quality may be achieved by suppressing higher-order modes in the transverse direction parallel to the resonator walls, also as described above in reference to FIGS. 6A-6C. Additionally, in gas discharge lasers, protrusion-type parasitic mode suppressor 609 may be used to facilitate the establishment of the lasing medium by introducing regions of high field for improved breakdown while still reducing the gain in the superfluous regions. For example, regions of high electric field may occur around any sharp points or edges of a parasitic mode suppressor, e.g., near a 90-degree edge or corner. These regions of high electric field may create a region of field that is much more intense than that created by the substantially planar resonator walls thereby improving breakdown in the area or region surrounding the high field regions. The resulting improved breakdown may then have the effect of improving power extraction and/or laser performance, among other things.

In addition, for systems in which the power supply circuitry would not be destroyed by a contact between the two resonator walls, a protrusion-type parasitic mode suppressor may fully span the spacing between the first and second resonator walls. Furthermore, a protrusion-type and/or recess-type parasitic mode suppressor may be shaped so as to achieve a desired capacitance between the first and second elongated planar electrodes 103 and 105. For example, the capacitance of the parasitic mode suppressor may be tuned by varying the cross sectional area A or the gap d, in which case, the capacitance is given by $C = \in_r \in_0 A/d$, where $\in_r$ is the relative permittivity of the gap, $\in_0$ is the permittivity of free space, and A is the area of the protrusion surface at a distance d away from the opposing resonator wall. To this end, the electrically insulating material 611 or 613, e.g., as shown in FIGS. 6D-6E, respectively, may be a dielectric material used to tune the dielectric permittivity of the gap between the elongated planar electrodes within the superfluous region.

Figure 7A:
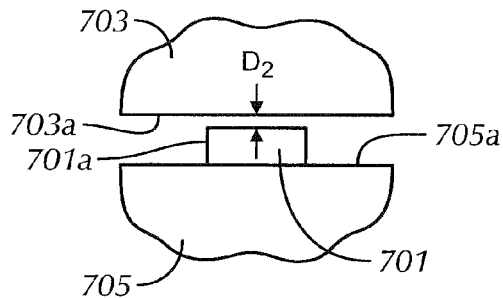
FIGS. 7A-7G show parasitic mode suppressors in accordance with one or more embodiments of the invention.
Figure 7B:
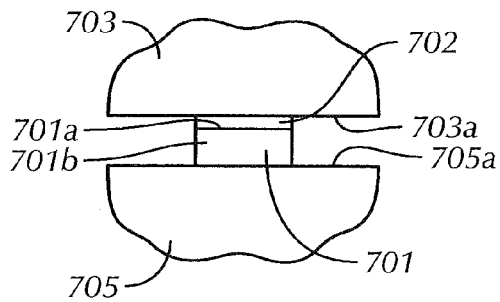
Figure 7C:
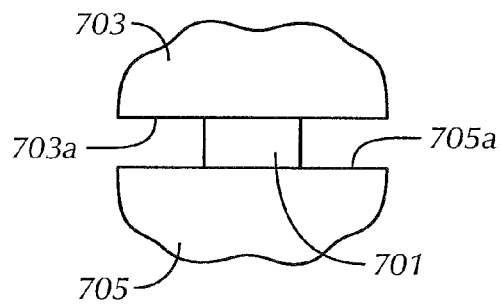
Figure 7D:
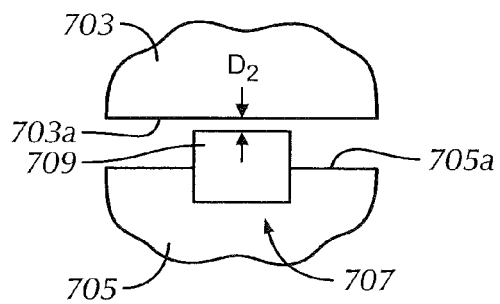

FIG. 7A-7G show parasitic mode suppressors in accordance with one or more embodiments. Parasitic mode suppressor 701 may be an insert 709 that is formed separately from, and then disposed between, the surfaces 703a, 705a, of the resonator walls 703, 705, respectively, as shown in Formed as a separate entity from the resonator walls 703 and 705, an insert-type parasitic mode suppressor 701 may advantageously be made out of any appropriate material. For a choice of the insert material requiring electrical isolation, e.g., if a metal is used to form the insert, a distance D2 may separate the insert-type parasitic mode suppressor 701 from the opposing resonator, e.g., wall 703a in FIG. 7A. In addition, in a manner similar to that described above in reference to FIGS. 6A-6E, a separation distance D2 between the wall 701a of the insert-type parasitic mode suppressor 701 and the opposing resonator wall surface 703a may be chosen to suppress a gas discharge, thereby suppressing parasitic and higher order resonator modes. Furthermore, the gap D2 may be used to tune the capacitance between electrodes if desired. Furthermore, the shape of the parasitic mode suppressor may be used to introduce higher field regions, if desired. Furthermore, as shown in FIG. 7B, an electrically insulating material 702 may be disposed between the upper surface 701a of the insert-type parasitic mode suppressor and the opposing resonator wall 703a as shown in FIG. 7B. Likewise, the insulating material 702 may be disposed between the lower surface 701b of the insert-type parasitic mode suppressor and the opposing resonator wall 705a without departing from the scope of the present disclosure. In addition, if electrical isolation between the walls is not necessary, or even if electrical isolation between the walls is necessary, but the insert itself is made entirely from an insulating material, the insert-type parasitic mode suppressor 701 may span the entire gap between the walls 703a and 705a of the resonator 703 and 705, respectively, as shown in FIG. 7C.

Figure 7E:
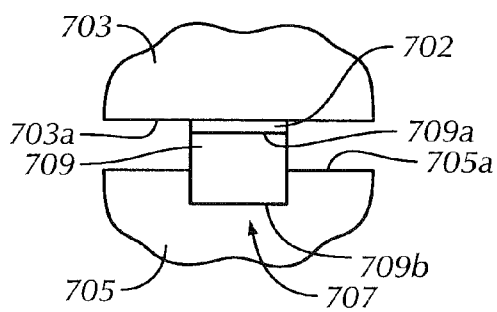

FIG. 7D-7G show other embodiments of insert-type parasitic mode suppressors. In these embodiments, the parasitic mode suppressor may be an insert 709 that is formed separately and inserted into one or more recesses 707 in one or more resonator walls. As already described above in reference to FIGS. 7A-7E, if the insert material requires electrical isolation, e.g., if a metal is used to form the insert, a distance D2 may separate the insert-type parasitic mode suppressor 709 from the opposing resonator wall, e.g., wall 703a in FIG. 7D. Furthermore, as shown in FIG. 7E, an electrically insulating material 702 may be disposed between an upper surface 709a of the insert-type parasitic mode suppressor and the surface 703a of the opposing resonator wall 703.

Figure 7F:
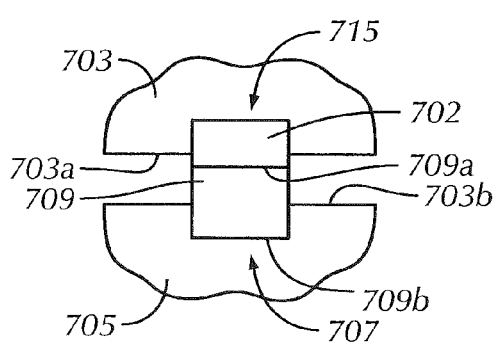
Figure 7G:
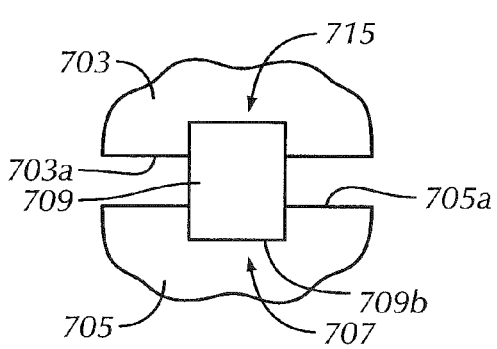

Likewise, the electrically insulating material 702 may be disposed between a lower surface 709b of the insert-type parasitic mode suppressor and the surface 703b of the opposing resonator wall 703. Similarly, as shown in FIG. 7F, an electrically insulating material 702 may be disposed between an upper (or lower) surface 701a of the insert-type parasitic mode suppressor and within a recess in a resonator wall, e.g., recess 715 on resonator wall surface 703a. In addition, if electrical isolation between the walls is not necessary, or even if electrical isolation between the walls is necessary, but the insert itself is made entirely from an insulating material, the insert-type parasitic mode suppressor 709 may span the entire gap between the walls 703a and 705a of the resonators 703 and 705, respectively, and may also fit within recesses 707 and 715 formed within the resonator walls 703a and 705a, respectively, as shown in FIG. 7G.

Figure 8A:
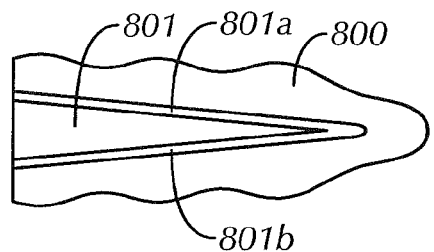
FIGS. 8A-8C show parasitic mode suppressors in accordance with one or more embodiments of the invention.
Figure 8B:
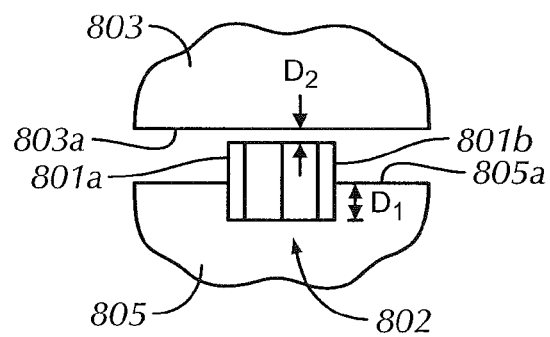
Figure 8C:
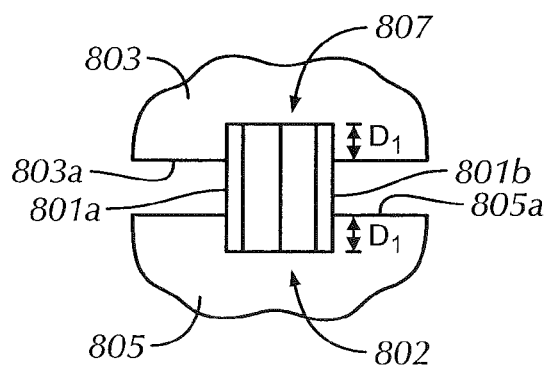

FIG. 8A shows a top view of a hollow parasitic mode suppressor 801 formed from walls 801a and 801b that are disposed within a recess that is located in resonator 800. FIG. 8B shows a cross-sectional view of the same hollow parasitic mode suppressor 801. Similar to the embodiments described above, in gas discharge lasers, the depth D1 of the recess 802 may be chosen so as to substantially reduce or eliminate a gas discharge within the superfluous region. Furthermore, similar to that described above in reference to FIGS. 7A-7E, if the resonator walls 803a and 805a require electrical isolation from each other, e.g., if a metal is used to form the insert walls 801a and 801b, a distance D2 may separate the insert-type parasitic mode suppressor 801 from the opposing resonator wall, e.g., wall 803a in FIG. 8B. In addition, if electrical isolation between walls 803a and 805a is not necessary, or even if electrical isolation between the walls is necessary, but the insert itself is made entirely from an insulating material, the insert-type parasitic mode suppressor 801 may span the entire gap between the walls 803a and 805a and/or may also fit within recesses 802 and 809 formed within the resonator walls 805 and 809, respectively, as shown in FIG. 8C.

Figure 9A:
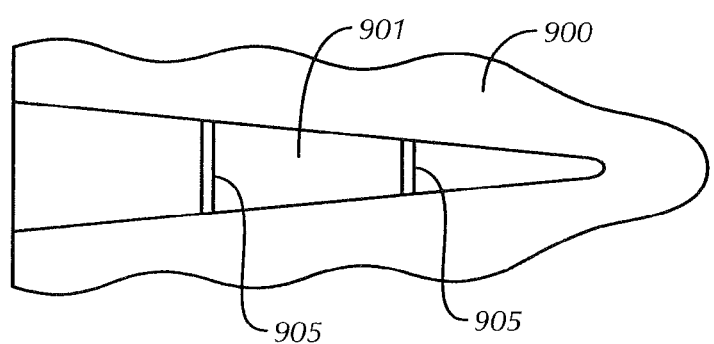
FIGS. 9A-9B show parasitic mode suppressors in accordance with one or more embodiments of the invention.
Figure 9B:
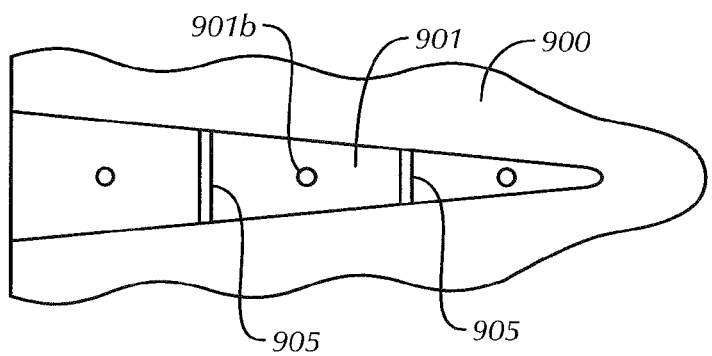

FIGS. 9A-9B are top views of parasitic mode suppressors of either the protrusion-type or insert-type. In FIG. 9A, the protrusion/insert type parasitic mode suppressor 901 may be either formed directly out of the resonator wall surface 900 or may be formed separately and adhered onto the resonator wall surface 900 using an appropriate adhesive. In addition, the protrusion/insert type parasitic mode suppressor 901 may be affixed to, or positioned by fasteners/pins 901b, as shown in FIG. 9B. Furthermore, in all the above examples, it may be the case that the presence of a relatively long protrusion/insert inside a gas discharge volume negatively affects the establishment of the lasing medium due to a restriction of the overall flow of gas through the discharge region. Accordingly, one or more cross-channels 905 may be included in the protrusion/insert-type parasitic mode suppressor 901 to allow gas flow between regions on either side of the mode suppressor. In accordance with one or more embodiments, the cross-channels channels may serve as vents and also allow for improved pulsing performance of the laser employing the resonator.

In accordance with one or more embodiments, a parasitic mode suppressor may be formed directly from, or be affixed to, one or more ends of a resonator wall and also may be formed directly from, or be affixed to, one or more extension members, as described below in reference to FIGS. 10-13. As referred to herein, the term extension-type parasitic mode suppressor includes both parasitic mode suppressors that are formed directly from, or affixed to, one or more ends of a resonator wall and also includes parasitic mode suppressors formed directly from, or affixed to, one or more extension members that are arranged near or at the longitudinal ends of the resonator walls. Furthermore, in the embodiments that follow, the resonator walls and/or the surfaces of the extension members may or may not constitute waveguide walls. Furthermore, in accordance with one or more embodiments, the parasitic mode suppressors may be formed from any reflecting, light-absorbing and/or light scattering material. The parasitic mode suppressor may be made out of a metal material, such as aluminum, or a ceramic material, such as alumina, or any combination thereof. Furthermore, metallic parasitic mode suppressors may be anodized or non-anodized. In accordance with one or more embodiments, a parasitic mode suppressor made out of reflective material may be shaped so as to reflect light away from a parasitic oscillation. Generally, the material(s) used for the parasitic mode suppressor may absorb, scatter, or deflect light that would otherwise contribute to a parasitic mode, without interfering with proper laser operation.

Figure 10A:
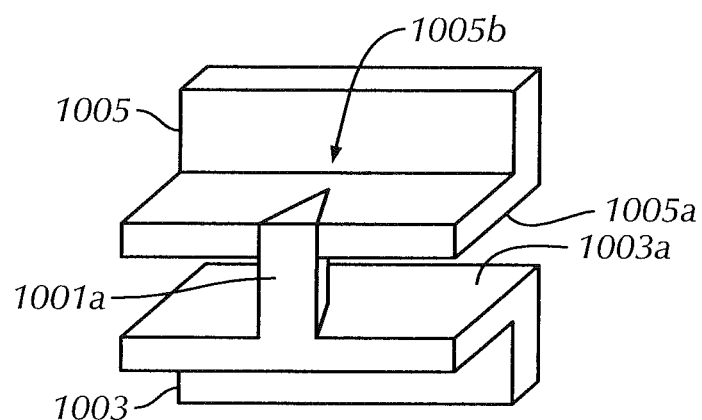
FIGS. 10A-10C show parasitic mode suppressors in accordance with one or more embodiments of the invention.
Figure 10B:
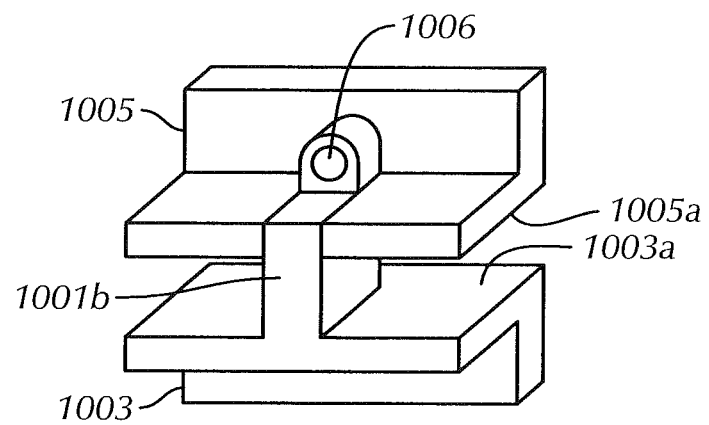
Figure 10C:
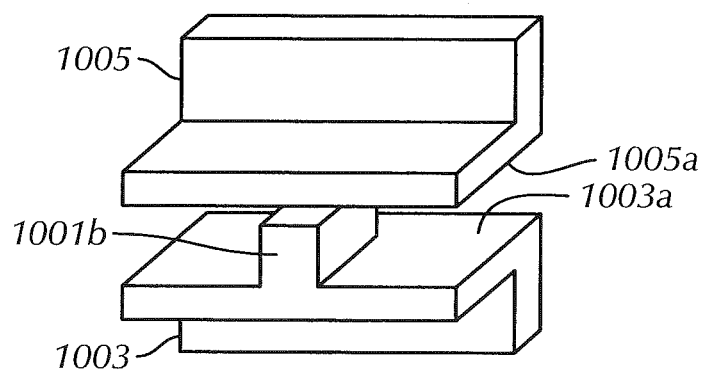

FIGS. 10A-10C show extension-type parasitic mode suppressors in accordance with one or more embodiments of the invention. The parasitic mode suppressors 1001a and/or 1001b may be mounted outside a laser gain medium within a pair of extension members, e.g., the pair extension members 127 and 129 or 131 and 133, as shown in FIG. 1A. Furthermore, these extension-type parasitic mode suppressors may be arranged similarly to the parasitic mode suppressor 323b shown in FIG. 3A and may be arranged similarly to 413b and 413c shown in FIG. 4A and 523 shown in FIG. 5A. For example, in FIGS. 10-13 described below, the extension-type parasitic mode suppressors are disposed between a longitudinal end of an elongated resonator wall and a mirror 1101, which may correspond to any of the multi-folding mirrors described above in reference to FIGS. 1-5. Accordingly, these extension-type parasitic mode suppressors may be employed separately or in combination with parasitic mode suppressors that are disposed within the laser gain medium, e.g., the mode suppressors described above in reference to FIGS. 6-10. Furthermore, the following embodiments may also include a pair of resonator walls and/or a pair of extension member surfaces. These resonator walls and/or extension member surfaces may or may not serve as waveguide walls in the transverse direction.

Returning to FIGS. 10A-10C, in accordance with one or more embodiments, the extension-type parasitic mode suppressors 1001a and/or 1001b may be formed directly out of any part upon which they reside. For example, as shown in FIG. 10A, the extension-type parasitic mode suppressors 1001a may be formed from the same structural piece, i.e., it may be an integrated part of, an L-shaped extension member 1003. However, one or more embodiments of the invention are not limited to L-shaped extension members and any suitable shape may be used without departing from the scope of the present disclosure. Furthermore, as shown in FIG. 10A, the extension-type parasitic mode suppressors 1001a may extend across the gap 1007 formed between the two opposing extension surfaces 1003a and 1005a. of extension members 1003 and 1005, respectively. Furthermore, in accordance with one or more embodiments, the extension-type parasitic mode suppressors 1001a may fit within a recess, or notch 1005b formed within the extension surface 1005a. Furthermore the extension-type parasitic mode suppressors 1001a may be triangular in cross-section and thus, the notch 1005b may be a similarly shaped triangular notch. However, an extension-type parasitic mode suppressor may have any cross-sectional shape and length without departing from the scope of the present disclosure. For example, FIG. 10C shows a parasitic mode suppressor having a length that extends only partially between two extension surfaces 1003a and 1005a.

Alternatively, in accordance with one or more embodiments, the extension-type parasitic mode suppressor may be formed separately as an insert 1001b and then affixed to an extension member 1005 with a fastener 1006, as shown in FIG. 10B, or may held in place by an adhesive, bonding, or friction. Furthermore, although FIGS. 10A-C show an extension-type parasitic mode suppressor disposed at the outer region of the extension surfaces, an extension-type parasitic mode suppressor may be disposed in any region of the extension surfaces without departing from the scope of this disclosure.

Figure 11A:
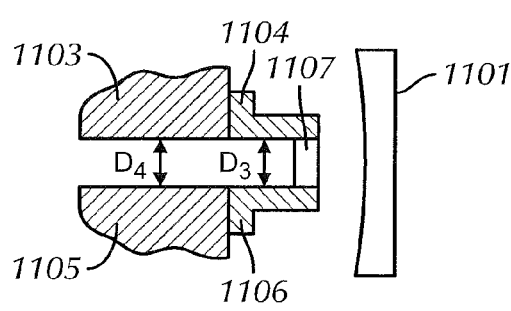
FIGS. 11A-11J show parasitic mode suppressors in accordance with one or more embodiments of the invention.

FIGS. 11A-11D show extension members having extension-type parasitic mode suppressors attached thereto. In each example, the extension members 1104 and 1106 that house the parasitic mode suppressors 1107 are disposed between the longitudinal ends of the elongated resonator walls 1103 and 1105 and the mirror 1101. As in FIG. 11A, extension members 1104 and 1106 include at least one parasitic mode suppressor 1107 that can be affixed directly to the extension members 1104 and 1106. The extension members 1104 and 1106 are themselves directly fixed to the ends of the resonator walls 1103 and 1105. While the example shown in FIG. 11A shows the parasitic mode suppressor 1107 as a separate insert that may be fixed between extension members 1104 and 1106, the parasitic mode suppressor 1107 may be alternately formed directly from the same structure as the extension member, like that shown in FIG. 10A. For embodiments where the resonator is part of a gas discharge laser resonator, some embodiments may employ conductive resonator walls 1103 and 1105. In these cases, the gas discharge between the extension members 1104 and 1106 may be suppressed if the extension members 1104 and 1106 are formed out of nonconductive material. For nonconductive resonator walls 1103 and 1105, the extension members 1104 and 1106 may be made out of either nonconductive or conductive material.

Figure 11B:
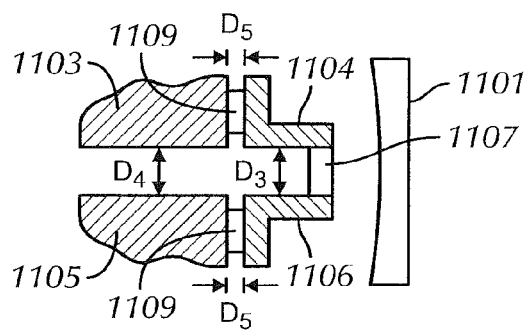
Figure 11C:
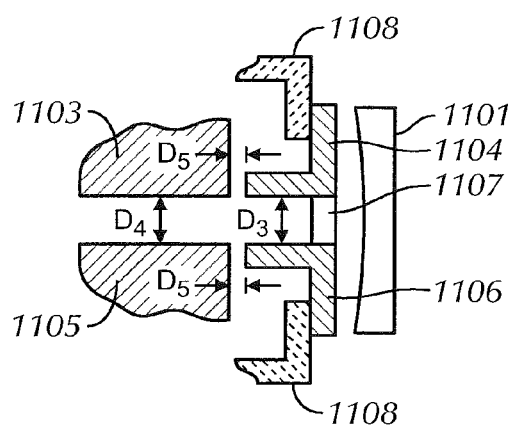
Figure 11D:
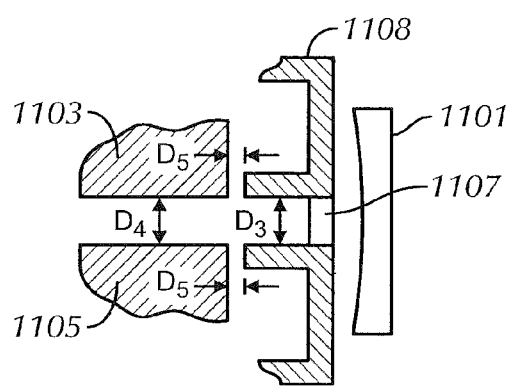

In accordance with one or more embodiments, the gas discharge laser may employ conductive resonator walls in the form of electrodes. Accordingly, FIGS. 11B-11D show illustrative embodiments that address the problem of electrically isolating the extension members 1104 and 1106 from the electrodes. In the embodiments shown in FIG. 11B, the extension members 1104 and 1106 are spaced off from the ends of the resonator walls 1103 and 1105, respectively, by a distance D5. Furthermore, the gap distance D5 may be filled with an electrically insulating material layer 1109. As before at least one parasitic mode suppressor 1107 may be positioned within the gap between the extension members 1104 and 1106. The distance D5 may be chosen to prevent a discharge from occurring between the ends of the resonator walls 1103 and 1105 and the extension members 1104 and 1106. Alternatively, the extension members 1104 and 1106 may be formed from portions of the housing 1108 and kept a distance D5 away from the ends of the resonator walls 1103 and 1105, as shown in FIGS. 11C and 11D. Accordingly, the electrical isolation of the extension members 1104 and 1106 may be maintained. As before, the distance D5 may be chosen to prevent a discharge. FIG. 11F shows yet another embodiment where the extension members 1104 and 1106 may be formed from portions of a mirror mount 1110 and kept a distance D5 away from the ends of the resonator walls 1103 and 1105.

Figure 11E:
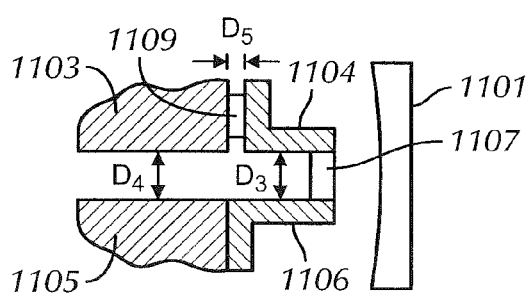
Figure 11F:
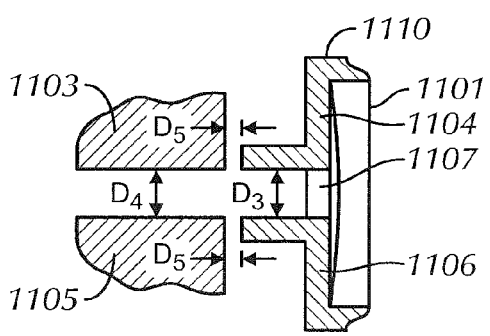

FIG. 11E shows one embodiment that may be employed in the case of a system in which one resonator wall is a grounded electrode. In this embodiment, any combination of an electrically insulated extension member 1104 affixed to an excited resonator wall 1103 and a non-insulated extension member 1106 affixed directly to the grounded resonator wall 1105 may be used. As before, at least one parasitic mode suppressor 1107 may be located within the gap between the extension members 1104 and 1106.

In accordance with one or more embodiments, the gaps shown in the drawings are not intended to limit the arrangement of the electrodes or the extension members but are shown merely for purposes of example. In actuality, the spacing D3 between the extension members 1104 and 1106 may be less than, greater than, or equal to the spacing D4 between the resonator walls 1103 and 1105.

Figure 11G:
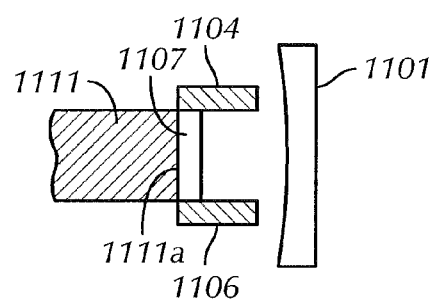
Figure 11H:
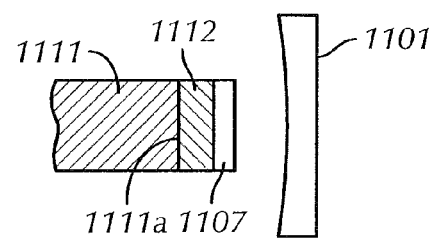
Figure 11I:
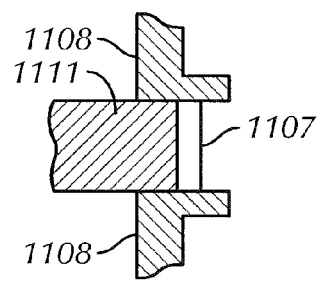
Figure 11J:

FIGS. 11G-11J show extension members that may be employed for use with a solid-state lasing medium. As shown in FIG. 11G, extension members 1104 and 1106 include at least one parasitic mode suppressor 1107 and may extend from a longitudinal end of solid-state lasing medium 1111. In accordance with one or more embodiments, the extension members 1104 and 1106 may be supported either from a housing encapsulating the solid-state lasing medium or by the end 1111a of the solid-state lasing medium 1111. For example, FIG. 11I shows a parasitic mode suppressor 1107 that is supported by a housing 1108 that surrounds the solid state lasing medium 1111. Furthermore, FIG. 11J shows another solid-state embodiment having a solid-state crystal with a gain portion and front and rear extension portions that are formed as part of the solid-state crystal. The gain medium portion is the only portion of the solid-state crystal that is excited such as through optical pumping via a flashlamp or laser diode. A parasitic mode suppressor is then embedded in or affixed to the non-excited portion of the solid-state crystal. Alternatively, as shown in FIG. 11H, a non-excited portion of solid-state material 1112 may abut the longitudinal end 1111a of the solid-state lasing material 1111. The non-excited portion of solid-state material 1112 may itself abut, or contain, at least one parasitic mode suppressor 907, thereby forming a mode-suppressing extension portion. For example, a non-excited extension portion may comprise an abutting non-lasing material or a portion of the solid-state material that is not pumped and therefore does not constitute a gain media portion.

Figure 12A:
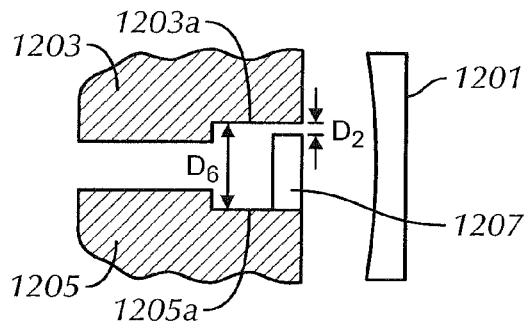
FIGS. 12A-12H show examples of slab resonators in accordance with one or more embodiments of the invention.
Figure 12B:
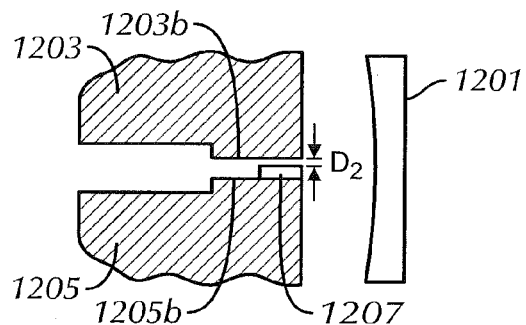

FIG. 12A-12E show parasitic mode suppressors that are mounted to the end of a resonator surface in accordance with one or more embodiments. FIG. 12A shows extension surfaces in the form of shelves 1203a and 1205a, that are formed within the longitudinal ends of resonator walls 1203 and 1205, respectively. In accordance with one or more embodiments, the resonator walls 1203 and 1205 may be the walls of elongated planar electrodes like those described above in reference to FIG. 1A or alternatively may be the inner walls of the open ended ceramic resonator cavity like that shown in FIG. 1B. In either case, at least one of the shelves 1203a and 1205a has affixed thereto at least one parasitic mode suppressor 1207, as shown in FIG. 12A. In accordance with one or more embodiments, the shelves 1203a and 1205a may be formed directly into the ends of the resonator walls 1203 and 1205. For gas discharge laser embodiments, the shelves 1203a and 1205a may be formed to a depth such that the distance D6 between the shelves 1203a and 1205a is large enough to suppress the gas discharge. For example, as described above in reference to FIGS. 1-5, for an excitation level configured for a 2 mm gap between the resonator walls, the distance D6 may be chosen to be 4 mm. The mode suppressor may be affixed by using a fastener, adhesive, friction or, alternatively, be an integral part of or bonded to the extension surface. Alternatively, if the absence of a discharge is not required, the shelf extension surfaces may take the form of protruding shelves 1203b and 1205b, at least one of which has affixed thereto at least one parasitic mode suppressor 1207, as shown in FIG. 12B.

As shown in FIGS. 12A-12B, if electrical isolation between the parasitic mode suppressor 1207 and the opposing shelf is desired, a distance D2 may separate the upper surface of the parasitic mode suppressor 1207 from the opposing shelf. However, a parasitic mode suppressor 1207 may fully span the distance D1 between the shelves if electrical isolation between the resonator walls is not required.

Figure 12C:
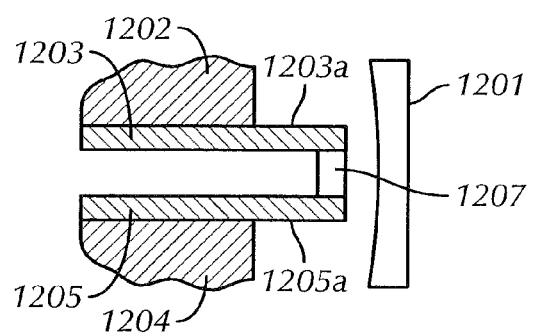
Figure 12D:
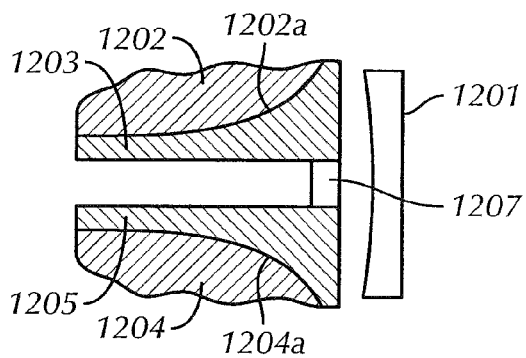

FIGS. 12C-12D show arrangements for a mode-suppressing extension surface in the form of a nonconductive resonator wall in accordance with one or more embodiments. In both FIG. 12C and FIG. 12D, nonconductive resonator walls 1203 and 1205 are attached to the inner surfaces of electrodes 1202 and 1204, respectively. In FIG. 12C, the nonconductive resonator walls 1203 and 1205 extend beyond the longitudinal ends of electrodes 1202 and 1204, respectively, to form a pair of extension surfaces 1203a and 1205a. In accordance with one or more embodiments, extension surfaces may be arranged as shown in FIG. 12D by including a taper 1202a and 1204a at the longitudinal ends of electrodes 1202 and 1204, respectively. Accordingly, the nonconductive resonator walls 1203 and 1205 are shaped having a corresponding complimentary taper so that they abut the tapered electrode walls in the end regions of the electrodes 1202 and 1204. As a result, there exists a region of the resonator walls 1203 and 1205 where a gas discharge is not induced because the gap between the electrode surfaces is too large. In these embodiments, the parasitic mode suppressor 1207 may be attached near the end of the tapered nonconductive resonator walls 1203 and 1205. Thus, in this example, the tapered regions of the nonconductive resonator walls 1203 and 1205 effectively form nonconductive extension surfaces for housing at least one parasitic mode suppressor 1207. In yet another embodiment shown in FIG. 12F, the parasitic mode suppressor 1207 may be attached to one of the surfaces of the tapered ends of electrodes 1202 and 1204 without the need for an additional nonconductive layer like that shown in FIG. 12D.

Figure 12E:
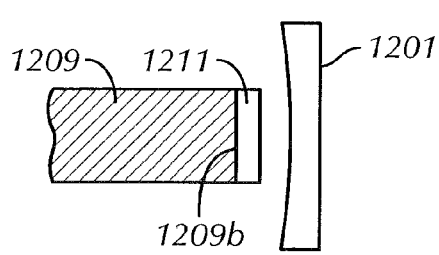
Figure 12F:
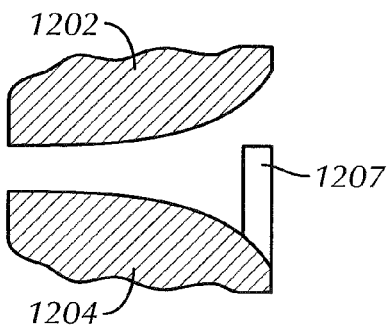
Figure 12G:
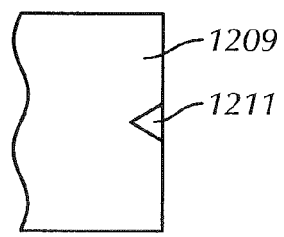
Figure 12H:
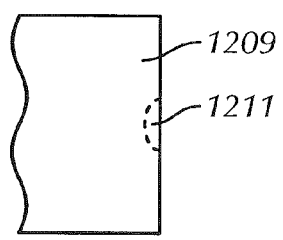

In accordance with one or more embodiments, the parasitic mode suppressor may be used in conjunction with a solid-state gain medium, as shown in FIG. 12E. For example, in this case, the parasitic mode suppressor 1211 is mounted to an end surface 1209b of the solid state gain medium 1209. In accordance with one or more embodiments, the parasitic mode suppressor 1211 may be embedded in the solid-state material or disposed on the outside end surface 1209b, as shown in the top views of FIGS. 12G and 12H. In the top view shown in FIG. 12G, the parasitic mode suppressor 1211 is a triangular-shaped structure that is embedded into the end of the solid state gain medium 1209. As described above, in reference to the other embodiments, this embedded structure may be a recess formed in the gain medium itself. In FIG. 12H, the parasitic mode suppressor 1211 is formed from a non-transmitting region in the gain medium itself, such a region may be formed, e.g., by bleaching that portion of the gain medium 1209.

Figure 13A:
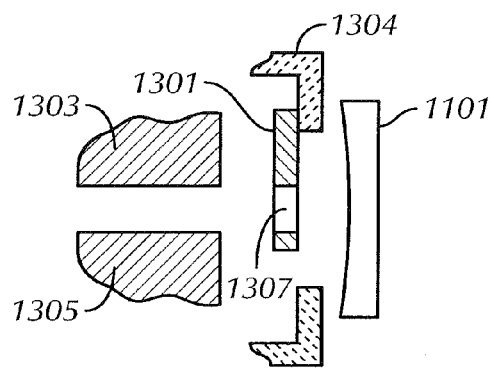
FIGS. 13A-13I show examples of slab resonators in accordance with one or more embodiments of the invention.
Figure 13B:
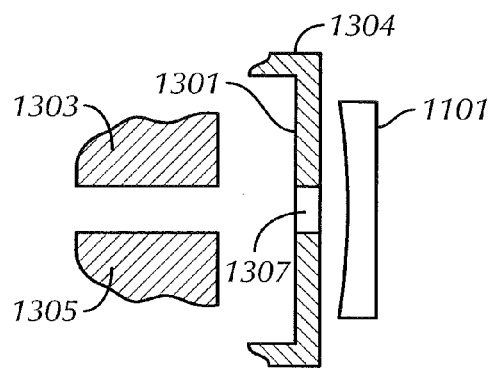
Figure 13C:
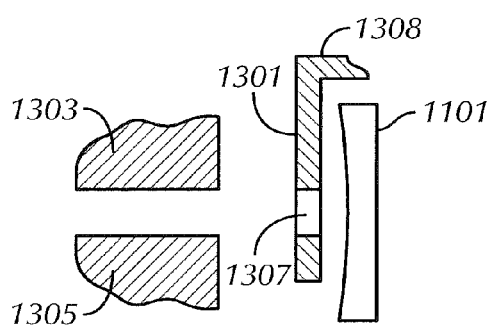
Figure 13D:
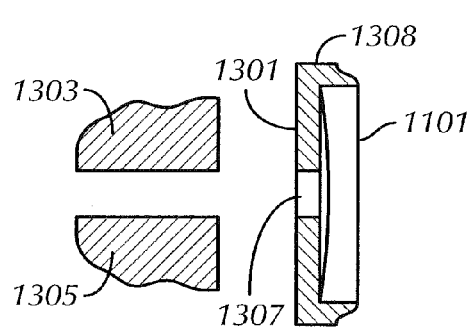
Figure 13E:
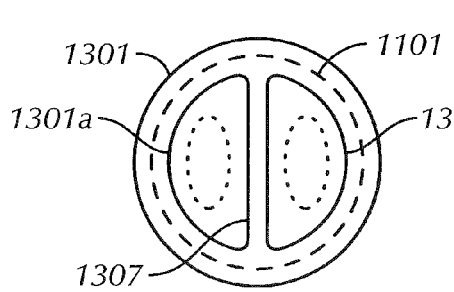
Figure 13F:
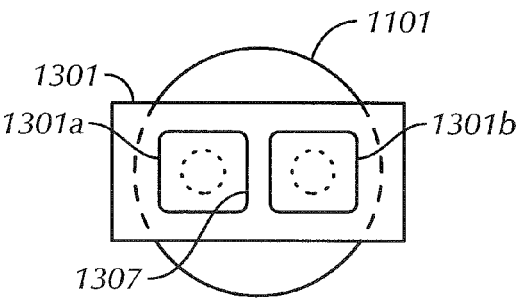

FIGS. 13A-13E show mode-suppressing shields in accordance with one or more embodiments. For example, FIGS. 13A-13B show a mode suppressing shield 1301 that is positioned near the mirror 1101 and supported from, or is an integrated part of, the housing 1304. FIGS. 13B-13C show a mode suppressing shield 1301 that is positioned near the mirror 1101 and is supported from, or is an integrated part of, the mirror mount 1308. In either case, at least one parasitic mode suppressor 1307 extends from the inner edge of the shield 1301, thereby forming one or more apertures for allowing transmission of the desired laser oscillation. For example, FIGS. 13E-13F show views along the path of the laser beam of two different types of mode suppressing shields 1301 positioned in front of a circular mirror 1101. The mode suppressing shields 1301 include apertures 1301a and 1301b for transmitting the laser beam that corresponds to the desired laser oscillation (represented by the dotted ellipses and circles in FIGS. 13E and 13F, respectively). For example, the position of the apertures 1301a and 1301b may correspond to outer portions 311a and 311b of the turning mirror 311, as shown in FIG. 3A. Likewise, the parasitic mode suppressors 1307 may be positioned in front of one or more portions of mirror 1101 so as to block the development and propagation of one or more parasitic modes. In other words, the parasitic mode suppressors 1307 while part of a shield 1301 are still located at one or more superfluous regions, as described above. Furthermore, while the parasitic mode suppressors 1307 are shown in FIGS. 13E-13F as integrated with the shield 1301, other structural arrangements are possible without departing from the scope of the present disclosure. For example, the parasitic mode suppressors 1307 may be a separate structure that is formed of a different material from the shield 1301 and then affixed to the shield using an appropriate adhesive and/or fastener.

Figure 13G:
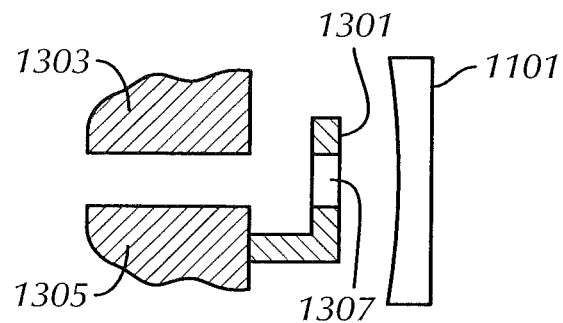
Figure 13H:
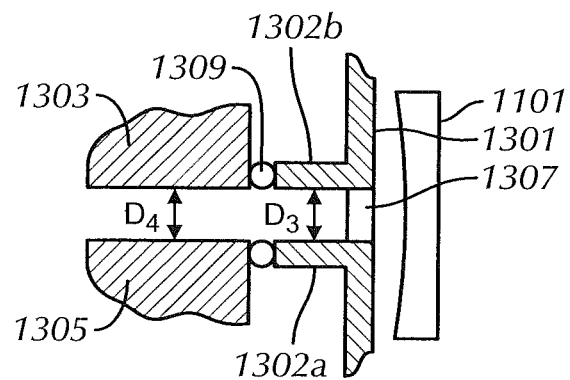

In addition, the shield 1301 may be supported from one of the resonator walls, e.g., resonator wall 1305, as shown in FIG. 13G. FIG. 13H shows another embodiment that employs a layer 1309 of electrically insulating material that is arranged between the shield 1301 and the resonator walls 1303 and 1305. This embodiment also provides extension members 1302a and 1302b and thus may provide the both the benefits of the extension members described above in reference to FIGS. 10-12 as well as the benefits of shields described above.

Figure 13I:
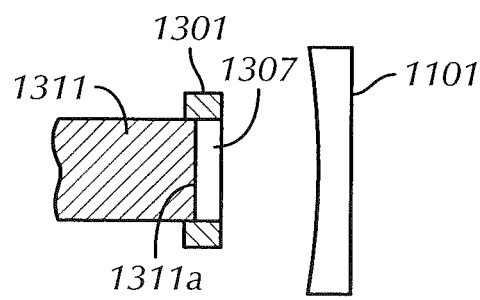

FIG. 13I shows an embodiment of a shield 1301 used in combination with a solid state gain medium 1311. In this solid-state embodiment, the mode-suppressing shield 1301 may be configured near the end 1311a of the solid-state gain medium 1311. The shield 1301 itself is supported from the end 1311a of the solid-state gain medium 1311. Furthermore, any of the shields 1301 described above that are mounted to, or an integrated part of the laser housing and/or mirror mount, may be used in combination with the solid state gain medium without departing from the scope of the present disclosure.

In all of the above examples, the shapes of the parasitic mode suppressors, the shapes of the shield members, and the shapes of any apertures are shown merely for the sake of illustration and thus, these structures may be have any shape (e.g., circular, rectangular, elliptical, triangular, etc.) without departing from the scope of the present disclosure. Furthermore, while the parasitic mode suppressor embodiments above are shown in the context of a stable resonators used in gas discharge and solid state lasers, the parasitic mode suppressors disclosed herein may be used in any laser resonator including unstable resonators without departing from the scope of the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A laser resonator comprising:
a first resonator wall;
a second resonator wall that is substantially parallel to the first resonator wall and is separated from the first resonator wall in a first transverse direction thereby defining a gap having a gap width between the first and second resonator walls;
a plurality of laser cavity mirrors comprising:
an output coupling mirror disposed at a first end of the first and second resonator walls;
a first curved mirror disposed at the first end of the first and second resonator walls;
a folding mirror disposed at the second end of the first and second resonator walls; and
a satellite mirror disposed at the first end of the first and second resonator walls, and
wherein the first curved mirror is disposed at the first end of the first and second resonator walls and is disposed between the output coupling mirror and the satellite mirror,
wherein the plurality of laser cavity mirrors are arranged to allow an intra-cavity laser beam to reflect from the output coupling mirror thereby forming a first beam spot on the output coupling mirror;
wherein the plurality of laser cavity mirrors are arranged to allow the intra-cavity laser beam to reflect from the first curved mirror thereby forming a second beam spot on the first curved mirror, and
wherein the first curved mirror has a radius of curvature such that the reflection of the intra-cavity laser beam from the first curved mirror causes the first beam spot on the output coupling mirror to have a substantially symmetric shape.

2. The laser resonator of claim 1,
wherein the intra-cavity laser beam is waveguided in the first transverse direction by the first and second resonator walls and a first transverse size $w_2$, along the first transverse direction, of the first beam spot on the output coupling mirror is determined by the gap width.

3. The laser resonator of claim 2, wherein a second transverse size, along a direction that is perpendicular to the first transverse direction, of the first beam spot on the output coupling mirror is substantially equal to the first transverse size, and wherein the second transverse size $w_1$ is determined, at least in part, by a radius of curvature R of the first curved mirror.

4. The laser resonator of claim 3, wherein the second transverse size $w_1$ is determined by the radius of curvature R1 of the first curved mirror, a radius of curvature R2 of the output coupling mirror, a length of the resonator L, and a wavelength of the intra-cavity laser beam $\lambda$, according to the equation $$w_1^2 = \frac{L\lambda}{\pi} \sqrt{\frac{g_1 g_2 (1 - g_1 g_2)}{(g_1 + g_2 - 2g_1 g_2)^2}},$$

where $g_1 = 1 - L/R_1$, $g_2 = 1 - L/R_2$.

5. The laser resonator of claim 1, wherein the output coupling mirror and the satellite mirror are disposed on either side of the first curved mirror to form a first stable resonator between the output coupling mirror and the first curved mirror and to form a second stable resonator between the satellite mirror and the first curved mirror.

6. The resonator of claim 1, wherein a radius of curvature of the first curved mirror is greater than or equal to 200 mm and less than or equal to 2000 mm.

7. The resonator of claim 1, wherein the output coupling mirror is a planar mirror.

8. The resonator of claim 1, wherein the gap width is greater than or equal to 1 mm and less than or equal to 5 mm.

9. The resonator of claim 1, wherein a length of the resonator L is greater than or equal to 10 cm and less than or equal to 1 m.

10. The resonator of claim 1, wherein the radius of curvature of the first curved mirror greater than or equal to 200 mm and less than or equal to 2000 mm, the output coupling mirror is a planar mirror, the gap width is greater than or equal to 1 mm and less than or equal to 5 mm, and a length of the resonator L is greater than or equal to 10 cm and less than or equal to 1 m.

11. A laser resonator comprising:
a first resonator wall;
a second resonator wall that is substantially parallel to the first resonator wall and is separated from the first resonator wall in a first transverse direction thereby defining a gap having a gap width between the first and second resonator walls;
a plurality of laser cavity mirrors comprising:
an output coupling mirror disposed at a first end of the first and second resonator walls;
a first curved mirror disposed at a second end of the first and second resonator walls;
a second curved mirror disposed at the second end of the first and second resonator walls; and
a third curved mirror disposed at the first end of the first and second resonator walls; and;
wherein the plurality of laser cavity mirrors are arranged to allow an intra-cavity laser beam to reflect from the output coupling mirror thereby forming a first beam spot on the output coupling mirror;
wherein the plurality of laser cavity mirrors are arranged to allow the intra-cavity laser beam to reflect from the first curved mirror thereby forming a second beam spot on the first curved mirror; and
wherein the first curved mirror has a radius of curvature such that the reflection of the intra-cavity laser beam from the first curved mirror causes the first beam spot on the output coupling mirror to have a substantially symmetric shape.

12. The resonator as claimed in claim 1, further comprising a gas lasing medium disposed in the gap.

13. The resonator of claim 1, wherein the first curved mirror and the folding mirror cooperate to fold the intra-cavity laser beam along a plurality of paths through a lasing medium,
wherein the plurality of paths define a boundary of a superfluous region within the resonator, wherein the intra-cavity laser beam does not pass through the superfluous region;
wherein the first curved mirror and the folding mirror form a laser resonator for a parasitic laser mode, a portion of which is located within the superfluous region;
a parasitic mode suppressor that is located within the superfluous region of the resonator and is disposed between the first end of the first resonator wall and the first mirror.

14. The resonator of claim 13, wherein the parasitic mode suppressor is attached to a surface of a recessed shelf disposed on the first end of the first resonator wall.

15. The resonator of claim 13, wherein the parasitic mode suppressor is attached to a surface of an extension member, and wherein the extension member is disposed proximate to the first end of the first resonator wall.

16. The resonator of claim 13, wherein the parasitic mode suppressor is attached to a surface of a shield member, and wherein the shield member is disposed proximate to the folding mirror.

17. The resonator of claim 13, wherein the parasitic mode suppressor at least partially blocks a beam path of the parasitic mode.

18. The resonator of claim 1, wherein an aspect ratio of the first beam spot on the output coupling mirror is greater than or equal to 1 and less than or equal to 1.2.

* * * * *